(12) United States Patent
Bhutada et al.

(10) Patent No.: US 11,403,286 B2
(45) Date of Patent: Aug. 2, 2022

(54) BRIDGE FROM NATURAL LANGUAGE PROCESSING ENGINE TO DATABASE ENGINE

(71) Applicant: SAP SE, Walldorf (DE)

(72) Inventors: Anup Bhutada, Nashik (IN); Rupam Ojha, Bangalore (IN); Srinivasan Ramanathan, Chennai (IN)

(73) Assignee: SAP SE, Walldorf (DE)

( * ) Notice: Subject to any disclaimer, the term of this patent is extended or adjusted under 35 U.S.C. 154(b) by 109 days.

(21) Appl. No.: 17/018,891

(22) Filed: Sep. 11, 2020

(65) Prior Publication Data

US 2022/0035799 A1    Feb. 3, 2022

(30) Foreign Application Priority Data

Jul. 28, 2020 (IN) .............................. 202011032234

(51) Int. Cl.
*G06F 40/40* (2020.01)
*G06F 16/242* (2019.01)
(Continued)

(52) U.S. Cl.
CPC ........ *G06F 16/243* (2019.01); *G06F 16/9566* (2019.01); *G06F 16/986* (2019.01); *G06F 40/40* (2020.01)

(58) Field of Classification Search
CPC .. G06F 16/243; G06F 16/9566; G06F 16/986; G06F 40/40
See application file for complete search history.

(56) References Cited

U.S. PATENT DOCUMENTS

| 7,729,934 B1 | 6/2010 | Adams |
| 7,917,497 B2 | 3/2011 | Harrison et al. |

(Continued)

FOREIGN PATENT DOCUMENTS

| CA | 2764493 C | 7/2018 |
| WO | WO 2015094871 A2 | 6/2015 |
| WO | WO 2016135746 A2 | 9/2016 |

OTHER PUBLICATIONS

Extended European Search report for Application No. 21188102.4, dated Dec. 22, 2021, 10 pages.

(Continued)

*Primary Examiner* — Ariel Mercado
(74) *Attorney, Agent, or Firm* — Klarquist Sparkman, LLP

(57) ABSTRACT

Methods and systems are disclosed for bridging a natural language processing (NLP) engine to a database engine, enabling natural language queries to be handled by the database engine. The NLP engine produces a query structure, containing an intent and one or more query parameters, for a natural language query. Rules are successively applied to the query structure. When a rule matches, a corresponding action is performed to identify a sub-intent, transform query parameters, or generate a filter string. The sub-intent is mapped to a query destination, which can be an intrinsic or extrinsic service offered by the data engine. A query string is constructed, including the query destination and any filter strings, and transmitted to the database engine to answer the original query. The disclosed technologies are flexible, easily reconfigurable, and future-proof. Variations and use cases are disclosed.

20 Claims, 12 Drawing Sheets

400

```
414 QUERY DATA STRUCTURE
(RECEIVED)

{
FallBackCode : 0,
Intent : Get_TransInfo,
FirstName : "William",
LastName : "Johnson",
TransactionID : NULL,
Date : "Last Month",
ProgramID : NULL,
BankInfo : NULL,
AccountNum : 3166,
AccountStatus : NULL,
StatusReason : NULL,
MathOperator : NULL,
}
```

→

```
474 QUERY DATA STRUCTURE
(PROCESSED)

{
FallBackCode : 0,
Intent : Get_TransInfo,
Sub-Intent : AccNumQuery,
FirstName : NULL,
LastName : NULL,
TransactionID : NULL,
Date : NULL,
DateFrom : 6/1/2020,
DateTo : 6/30/2020,
ProgramID : NULL,
BankInfo : NULL,
AccountNum : 3166,
AccountStatus : NULL,
StatusReason : NULL,
MathOperator : NULL,
}
```

(51) Int. Cl.
*G06F 16/958* (2019.01)
*G06F 16/955* (2019.01)

(56) References Cited

U.S. PATENT DOCUMENTS

| | | | |
|---|---|---|---|
| 9,495,331 | B2 | 11/2016 | Govrin et al. |
| 10,303,999 | B2 | 5/2019 | Hertz et al. |
| 10,346,753 | B2 | 7/2019 | Soon-Shiong et al. |
| 10,418,032 | B1 * | 9/2019 | Mohajer ............... G06F 16/258 |
| 10,546,001 | B1 * | 1/2020 | Nguyen ............... G06F 40/186 |
| 10,552,541 | B1 | 2/2020 | Dreher et al. |
| 10,614,106 | B2 | 4/2020 | Kelsey et al. |
| 2014/0358889 | A1 | 12/2014 | Shmiel et al. |
| 2015/0120641 | A1 | 4/2015 | Soon-Shiong et al. |
| 2016/0012105 | A1 * | 1/2016 | Chang .................. G06F 16/248 707/706 |
| 2017/0364520 | A1 * | 12/2017 | Venkataraman ...... G06F 40/106 |
| 2019/0095257 | A1 * | 3/2019 | Bhatia ...................... G06F 9/541 |
| 2019/0095927 | A1 | 3/2019 | Shimpi et al. |
| 2019/0286906 | A1 | 9/2019 | Bivens et al. |

OTHER PUBLICATIONS

Dar et al., "Frameworks for Querying Databases Using Natural Language: A Literature Review", ArXiv 1909.01822, https://arxiv.org/abs/1909.01822, 18 pages (Sep. 3, 2019).

Dhole et al., "Medical Information Extraction Using Natural Language Interpretation", Advances in Vision Computing (AVC), vol. 1, No. 1, pp. 19-25 (Mar. 2014).

Hendry, "DHS prepares to set new SAP-based payments platform live", available from https://www.itnews.com.au/news/dhs-prepares-to-set-new-sap-based-payments-platform-live-522905, excerpt, 4 pages (Mar. 2019).

"How to POST OData entity and link it to multiple existing entries at the same time?", available from https://stackoverflow.com/questions/61229762/how-to-post-odata-entity-and-link-it-to-multiple-existing-entities-at-the-same-t, pp. 1-5 (downloaded Aug. 14, 2020).

Nelson, "Natural Language Processing (NLP) Techniques for Extracting Information", available from https://www.searchtechnologies.com/blog/natural-language-processing-techniques, pp. 1-16 (downloaded Aug. 14, 2020).

"Open Data Protocol (OData)", available from https://docs.microsoft.com/en-us/dynamics365/fin-ops-core/dev-itpro/data-entities/odata, pp. 1-11 (Jun. 2020).

Pandey, "Sap oData Service [POST]: Multiple Table Input", available from https://blogs.sap.com/2018/03/30/sap-odata-post-multiple-table-input/, pp. 1-54 (Mar. 2018).

SAP, "SAP HANA Core Data Services (CDS) Reference", available from https://help.sap.com/doc/29ff91966a9f46ba85b61af337724d31/2.0.02/en-US/SAP_HANA_Core_Data_Services_CDS_Reference_en.pdf, pp. 1-299 (Jul. 2017).

Singh, "Chat Bots—Designing Intents and Entities for you NLP Models", available from https://medium.com/@brijrajsingh/chat-bots-designing-intents-and-entities-for-your-nlp-models-35c385b7730d, pp. 1-7 (Jan. 2017).

Skeggs et al., "A Shallow Parsing of Approach to Natural Language Queries of a Database", Journal of Software Engineering and Applications, 12, pp. 365-382 (Sep. 29, 2019).

"Step 7: Train the Natural Language Processing Clarifiers", available from https://www.mindmeld.com/docs/quickstart/07_train_the_natural_language_processing_classifiers.html, 14 pages (downloaded Aug. 14, 2020).

* cited by examiner

400

414 QUERY DATA STRUCTURE (RECEIVED)

```
{
FallBackCode : 0,
Intent : Get_TransInfo,
FirstName : "William",
LastName : "Johnson",
TransactionID : NULL,
Date : "Last Month",
ProgramID : NULL,
BankInfo : NULL,
AccountNum : 3166,
AccountStatus : NULL,
StatusReason : NULL,
MathOperator : NULL,
}
```

→

474 QUERY DATA STRUCTURE (PROCESSED)

```
{
FallBackCode : 0,
Intent : Get_TransInfo,
Sub-Intent : AccNumQuery,
FirstName : NULL,
LastName : NULL,
TransactionID : NULL,
Date : NULL,
DateFrom : 6/1/2020,
DateTo : 6/30/2020,
ProgramID : NULL,
BankInfo : NULL,
AccountNum : 3166,
AccountStatus : NULL,
StatusReason : NULL,
MathOperator : NULL,
}
```

*FIG. 4*

BRIDGE FROM NATURAL LANGUAGE PROCESSING ENGINE TO DATABASE ENGINE

CROSS REFERENCE TO RELATED APPLICATIONS

This application claims priority to India Patent Application Number 202011032234, filed Jul. 28, 2020, titled "BRIDGE FROM NATURAL LANGUAGE PROCESSING ENGINE TO DATABASE ENGINE," which application is hereby incorporated by reference in its entirety.

BACKGROUND

Natural language processing (NLP) of queries continues to be an area of great interest, and a range of tools is available to assist with this task. At the same time, database technologies continue to evolve and modern database engines offer powerful arrays of tools, which can include both built-in tools and add-on functions. Add-on functions can variously be provided by a database vendor or a software partner, or can be custom-built for a particular database customer. However, there has remained a problem of bridging existing NLP tools with existing database tools. Some approaches have included building custom NLP tools for the requirements of a particular database deployment, or customizing database tools to match NLP outputs. Building a custom NLP tool can involve a large engineering effort, and an NLP tool for one database deployment can be inadequate for another database deployment. On the other hand, customizing database tools can require re-engineering even simple built-in functions, of which there can be many, and can be specific to one particular NLP tool. Thus, the effort of customizing database tools may need to be repeated if there is a desire to change NLP tools, or even for a trial with a different NLP tool.

Accordingly, there remains a need for improved technologies to provide bridges between NLP tools and database tools that are flexible and easy to configure or reconfigure.

SUMMARY

In brief, the disclosed technologies provide a bridge between output of an NLP engine, in the form of a structured representation of a natural language query, and an exposed interface of a database query processor. In some examples, the NLP engine can deliver an intent and query parameters in a query data structure. The bridge can extract a sub-intent, which can be mapped to a specific (target) database interface, and can transform the query parameters to conform with the target database interface. A database query can be constructed identifying the target interface and providing the requisite parameters. The disclosed technologies can be readily configured and reconfigured to support additional query types, changes of NLP engine, or additional database query handlers.

In certain examples, the disclosed technologies can be implemented as computer-readable media storing instructions which, when executed by one or more hardware processors, cause the hardware processors to perform the following actions. A data structure having multiple fields is received. The fields represent an intent and one or more input query parameters extracted from a natural language query. The data structure is analyzed to determine a sub-intent. A set of the input query parameters is transformed into a set of output query parameters, based at least partly on the sub-intent. A query destination is determined, based on the sub-intent. An output query is constructed, including the query destination and a filter derived from the set of output query parameters. The output query is transmitted to the query destination.

In some examples, the analyzing can include processing a set of rules according to a predefined ordering. The ordering can be a linear ordering or a partial ordering. Processing of one rule can determine which rule can be processed next. Each rule can include a respective pattern among the fields of the data structure. In turn, the processing can include comparing the respective patterns of successive rules with the fields defined in the data structure. The comparing can determine a match, for a first of the compared rules. A sub-intent predefined for the first rule can be selected as the sub-intent for the first query.

In further examples, the processing can include determining that the comparing is a match, for a second rule. A transformation function, predefined for the second rule, can be executed on at least one of the input query parameters. The transformation function can cause one or more new fields to be added to the data structure. The sub-intent can also be added to the data structure. The transforming operation can parse a given input query parameter into multiple output query parameters. The transforming function can cause one or more fields, not required for the instant sub-intent, to be deleted or marked undefined in the data structure. The transforming function can determine a (new) output query parameter based on one or more of the input query parameters. The processing can include determining that the comparing is a match, for a third rule. The output query construction can include execution of a filter generation function, predefined for the third rule, on at least one of the output query parameters.

In additional examples, the query destination can be a web service represented by a uniform record locator (URL). The sub-intent can be determined from among multiple available sub-intents, at least one of which can target an intrinsic query of a database environment as the query destination, while at least one other sub-intent can target an extrinsic query of the database environment. Two of the available sub-intents can target query destinations in distinct database environments.

In some examples, the received data structure can include a fallback code indicating whether an exception was encountered during processing of the natural language query prior to receiving the data structure. In cases where the received fallback code indicates that no upstream exceptions were encountered, the operations can also include setting the fallback code to indicate an exception encountered during the analyzing or transforming operations, or during determination of the query destination. The exception can be an insufficiency or invalidity of one, some, or all of the input query parameters. The data structure can be implemented in JavaScript Object Notation (JSON) or Extensible Markup Language (XML) format. The transmitted output query can conform to the Open Data Protocol (OData).

In still further examples, a second sub-intent can be selected, distinct from and in addition to the first sub-intent. The operations can then include constructing and outputting a second query string corresponding to the second sub-intent. Two matching rules can have distinct associated sub-intents. Respective scores can be computed for the matching sub-intents, and one sub-intent can be selected based on a comparison of the scores. The query destination can be a Uniform Record Locator (URL) of a data entity (e.g. row, table, field, view) in a database. A single natural language query can be evaluated as two distinct queries, for which respective query structures are received at the bridge module, and respective output queries are formed and transmitted to respective query destinations. The output query can be a string conforming to a standards-based protocol. The query destination can include a service root specification and a resource path associated with the sub-intent.

In certain examples, the disclosed technologies can be implemented as a computer-implemented method. A data structure representing a natural language query is received from a natural language processing (NLP) engine. The query structure includes, for respective fields, an intent and one or more query parameters. A ruleset, containing multiple rules, is also received. Each rule has a respective field specification and identifies one or more functions. A determination is made, for each rule, whether the query structure matches the corresponding field specification. The query structure is determined to match the respective field specification for at least first, second, and third rules. A respective function of the first rule is executed to add a sub-intent value to the query structure. A respective function of the second rule is executed to update the query parameters in the data structure. A respective function of the third rule is executed to construct a filter string from one or more of the received or updated query parameters. A query string is constructed, including a base record locator (corresponding to the sub-intent) and the filter string. The query string is transmitted to a web service of a database engine, causing a query result to be generated by the database engine.

In some examples, the field specification for the first rule includes one or more identifiers of respective fields that are defined in the data structure at the time of determining the matching for the first rule. The field specification for the first rule can include the intent. The field specification for the second rule can include the sub-intent value. The determination of matching can include, for successive fields of the field specification, calculating a hash value and using the hash value as an index into the query structure to check whether the instant field is defined at the indexed position in the query structure.

In certain examples, the disclosed technologies can be implemented as a system having one or more hardware processors, with memory coupled thereto, and computer-readable media storing executable instructions for implementing a natural language processing (NLP) engine and a bridge module. The NLP engine is configured to receive a natural language query and process the natural language query by preprocessing the natural language query (to obtain a preprocessed query), applying an annotator, named entity recognition, and lexical rules in parallel (to obtain a plurality of parse trees representing the natural language query), applying a feature function (to obtain respective scores for the parse trees), selecting one of the parse trees based on the scores, identifying an intent and input query parameters according to the selected parse tree, and storing the intent and the input query parameters in an intermediate data structure. The bridge module is configured to generate a query string, corresponding to the intermediate data structure or to the natural language query, by comparing a plurality of rules to features of the intermediate data structure (to determine one or more matching rules of the plurality of rules) and, based on matching rules, identifying a sub-intent and a corresponding base record locator, transforming a set of the input query parameters into a set of the output query parameters, constructing a query filter from the output query parameters, and constructing the query string from the base record locator and the query filter. The system is configured to obtain a result for the natural language query by transmitting the query string to the database engine.

In some examples, the parse trees can be obtained by bottom-up evaluation of a sequence of tokens extracted from the natural language query. The input query parameters can be obtained by top-down evaluation of one or more semantic functions on respective nodes of the selected parse tree.

The foregoing and other objects, features, and advantages of the invention will become more apparent from the following detailed description, which proceeds with reference to the accompanying figures.

BRIEF DESCRIPTION OF THE DRAWINGS

FIG. 4 is a diagram illustrating transformation of a query data structure according to the disclosed technologies.

DETAILED DESCRIPTION

Introduction

1. Background

Figure 1:
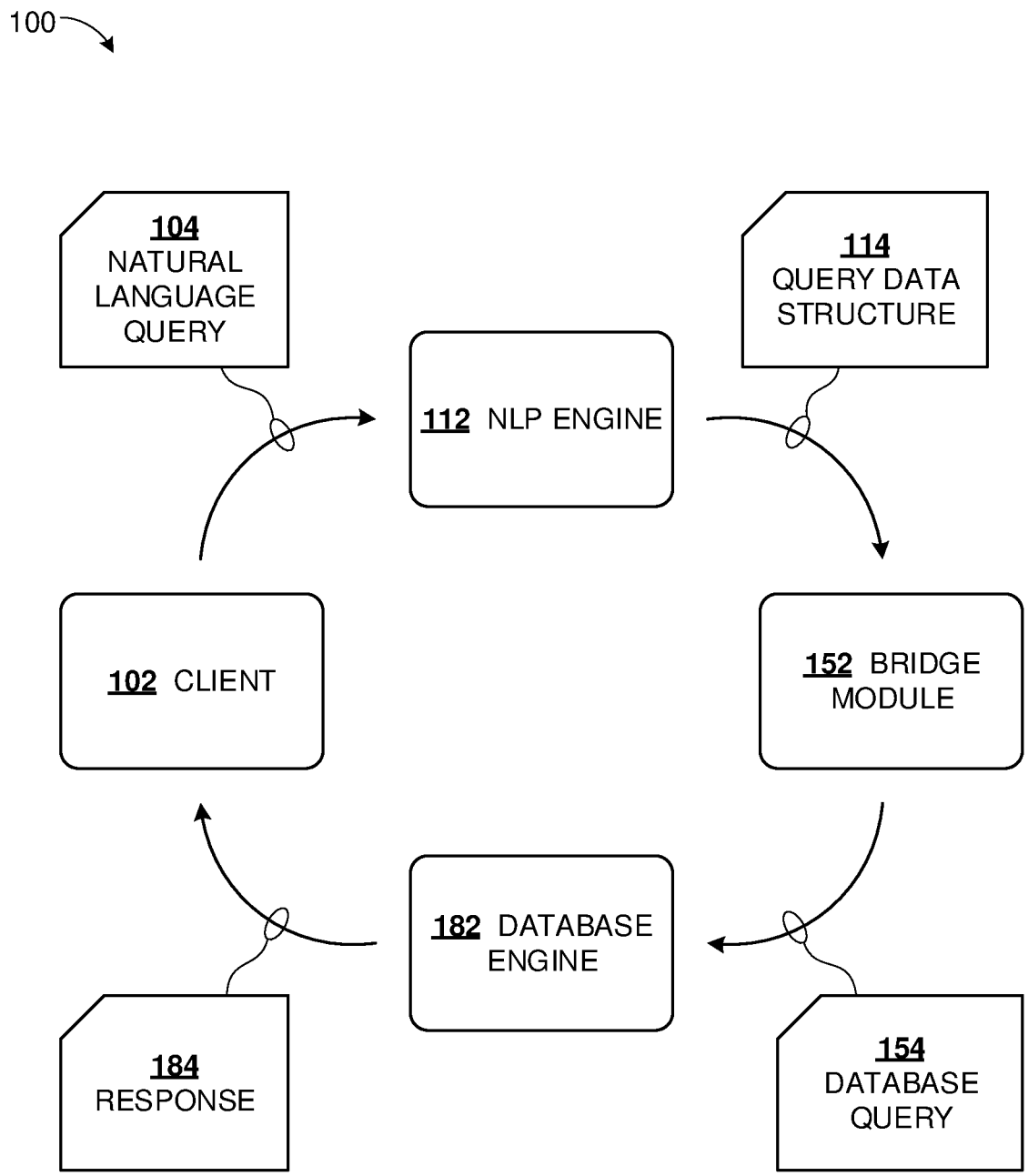
FIG. 1 is a diagram illustrating an example of bridging, between an NLP engine and a database engine, according to the disclosed technologies.

Many query environments are targeted to databases. Database queries, even if presented in natural language, have hitherto often been limited to queries presented in one of a few fixed query formats, sometimes dubbed static query formats. However, true natural language can permit expressing the same query in many different forms, sometimes dubbed dynamic query formats. The query format can change based on word order, synonyms, relative vs absolute expressions (e.g. "last month" vs "June 2020"), using specialized vocabulary or acronyms, or inherent attributes (e.g. "my tax return" vs "Form 1040 and all schedules"; the former would usually be understood correctly by a person, even though the phrase "my tax return" could cover other tax filings). Furthermore, as technologies becomes increasingly globalized, query construction by native speakers of one language can differ considerably from the queries constructed by native speakers of another language. Accordingly, dynamic query processing can be difficult to implement in conjunction with database backends.

2. Natural Language Processing (NLP)

In recent years, NLP has made significant strides and, in many contexts, tools are available to extract structure from a natural language query. NLP tools can utilize a variety of text processing techniques including preprocessing, annotation, named entity recognition, word embeddings, parse trees, lexical rules, or semantic rules. Neural networks can be implemented using a BERT language model (Bidirectional Encoder Representations from Transformers) and can be adapted to various knowledge domains. However, outputs from an NLP engine can have a form that may differ from the organization of attributes and functions exposed by a pre-existing database interface. Accordingly, a bridging problem can remain between NLP engine (frontend) and a database engine (backend). The disclosed technologies are directed towards solving this problem.

3. Aspects of the Bridging Problem

The bridging problem between NLP and database technologies is exacerbated by a few factors. Firstly, both NLP and database technologies can each involve very large amounts of software code. Accordingly, re-engineering either to suit the other can require a prohibitive amount of effort. Then, database technologies are not uniform among deployments. In one aspect, database technologies are applied in many different knowledge domains, and the natural language vocabulary in these domains can vary considerably. For example, the vocabulary for banking (account, transaction), manufacturing (machine, cycle time, inventory), or oil exploration (well, temperature, reserves) can have very little in common. In another aspect, database deployments can be customized with extrinsic functions, so that the scope of addressable queries can vary greatly even in a same industry. For example, a database for one manufacturing environment can have extrinsic functionality added for powerful analysis of quality data, using e.g. cluster analysis, regression, or principal component analysis, which can be absent or different in another database deployment for a similar manufacturing process. Still further, both database and NLP technologies evolve. As extrinsic functions are added to a database deployment, as an underlying query language (e.g. SQL, ABAP, or JAVA® languages) is changed, or a database is ported from one vendor to another, refactorization of query handling can be required. Conversely, as newer NLP technologies provide better performance, the query environment can be ported from an old NLP engine to a new one, initially for testing, or later for production. All such problems can increase the challenge involved in bridging NLP and database technologies.

One approach to bridging has been to adapt the NLP engine to conform to the database interface. However, for all the reasons described above, the considerable effort entailed can have very limited utility to a single deployment for a short period of time. Such conventional approaches are fragile. The presently disclosed technologies provide a superior, robust solution that is flexible, easy to configure, easy to reconfigure, and thereby also future-proof.

4. The Present Approach

The disclosed technologies solve the bridging problem by systematically determining the items required by a database engine from the items provided by an NLP engine. The process can be described in four aspects at design time. First, the space of queries to be handled can be mapped to available database functions. For example, some queries can be handled by intrinsic database functions, either by retrieving a specific data item from the database, or by retrieving a collection of data from a table, a calculated view, or using a core data service or other intrinsic function. Other queries can be handled by such intrinsic functions, combined with a post-processing or aggregation operation, such as "sum", "average", or "maximum". Further queries can require an extrinsic function, for example to perform a fuzzy search on a database, such as for a person's name. In some cases, in order to increase the scope of addressable queries, additional extrinsic functionality can be added to the database environment after initial deployment. These intrinsic or extrinsic functions offered by a database engine can be destinations for queries. In this aspect, query destinations are identified to cover the space of queries.

In a second aspect, a mechanism can be developed for identifying each query destinations from a query data structure (as can be output from an NLP engine). To illustrate, several queries directed to transactions can be presented as Intent=Transaction_Inquiry by the NLP engine, but may correspond to various distinct query destinations. If the account number is included in the query, then query-by-account-number can accurately and efficiently obtain the requested data using intrinsic functions of the database engine. However, if the account number is not provided, but the account-holder's name is provided, then a fuzzy search can be used in an extrinsic query-by-name operation. The same query system can also be used for aggregated queries for a bank branch, rather than for a single customer. All of these queries can be reported as Intent=Transaction_Inquiry by the NLP engine, but can have distinct query destinations. Generally, examination of other query parameters can be used to deduce a more precise intent (dubbed a "sub-intent") which can be mapped directly to the desired query destination. That is, by inspecting which among Account Number, Name, and Branch Identifier are provided, the proper Sub-Intent can be determined. Field specifications can be developed to indicate which fields or values of a query data structure can be associated with which sub-intent. In some cases, a query can provide redundant information (e.g. both Account Number and Name) which can be addressed by either query-by-account-number or query-by-name. In such cases, selection of sub-intent can be a design choice. In some examples, intrinsic function can be preferred over extrinsic functions as query destinations, for reasons of computing efficiency, however other prioritization logic can also be used.

In a third aspect, a mechanism can be developed for extracting the query parameters required by a particular query destination (from the perspective of the bridging module, these are "output query parameters") from the query parameters provided from the NLP engine (from the perspective of the bridging module, these are "input query parameters"). Examples of query parameter transformations include parsing (e.g. splitting a Name value "William Johnson" into separate First_Name and Last_Name values), directory lookup (e.g. determining City and State values from a Zip Code value), or concatenation (e.g. combining "20" and "Main Street" into a single Street Address value "20 Main Street"). Query parameter operations can include deletion (or, setting value to undefined) for superfluous query parameters, or validation of output query parameters (e.g. to pick up errors such as a six digit zip code early in the query pipeline). Parameter transformation functions can be developed for these and other operations.

In the fourth aspect, filter generating functions can be developed to encode the output query parameters as filter strings to conform with the query destination. For example, output query parameters First_Date, Last_Date can be coded as "date .ge. [First_Date] and date .le. [Last_Date]" for some query destinations or as "Date_Range: ([First_Date],

[Last_Date])" for other query destinations. (The notation [parameter], in square brackets, denotes the value of the parameter.) The filter strings for the various output query parameters can be passed to the query destination for fulfillment of the query.

5. Implementation with Rules

Some examples of the disclosed technologies can be implemented using a collection of rules. Each rule can have a condition, in the form of a field specification, and one or more actions, in the form of filter generating functions, parameter transformation functions, or other functions. Processing a rule can determine whether the field specification is matched by an instant query data structure. If there is a match, the specified action(s) can be taken. Processing the rules can allow identification of sub-intent, transformation from input to output query parameters, and filter string generation. Furthermore, ordering of the rules can enforce desired prioritization in cases where alternative query destinations are available.

6. Banking Use Case

Some examples herein are described in context of a banking query because queries on a bank account are familiar to most people, and because features and advantages of the disclosed technology can be readily illustrated with such examples. However, the disclosed technologies are widely applicable to many domains in which databases and queries are applied. The following sections also present other use cases. The various use cases demonstrate the utility of the disclosed technologies to enable a virtually unlimited number of variably formatted queries to be fulfilled seamlessly by database engines in conjunction with NLP engines.

Table 1 lists a number of natural language queries which can be handled in a single deployment of the disclosed technologies, with a common simple query data structure (described further below e.g. in the context of FIG. 4).

TABLE 1

| No. | Query |
|---|---|
| 1 | I want to view transactions of customer ID 12345 done in last two months. |
| 2 | Please display the transactions done under program PJ123 between 21 Jan. 2020 to 25 Feb. 2020. |
| 3 | Display all the users whose accounts are disabled. |
| 4 | Display all the users which are enrolled in program PJ123 who have their account disabled. |
| 5 | State the reason the account of Peter Adams is disabled. |
| 6 | Show the bank info of Peter Adams. |
| 7 | Show the bank details of Person with ID 12345. |
| 8 | What is the maximum amount paid to the Person ID 12345 in the last two months? |
| 9 | What is the minimum amount scheduled to be paid to Peter Adams in the next three months? |

7. Industrial Use Case

Table 2 lists a number of natural language queries that can be supported in an industrial process control environment.

TABLE 2

| No. | Query |
|---|---|
| 1 | What is the outlet temperature of boiler number 12345? |
| 2 | Display the compressor ID number used in water treatment plant 2. |
| 3 | What is the threshold limit for inlet temperature for the heat exchanger in the smelter plant? |
| 4 | Display the average pressure outlet values of boiler 12345. |
| 5 | What is the current production status? Is it above or below average? |
| 6 | What was the maximum stress on the column ABC in the last hour? |
| 7 | Show the distillate composition in number 3 distillation tower. |

8. Telecommunications Use Case

Table 3 lists a number of natural language queries that can be supported in a telecommunication network management environment.

TABLE 3

| No. | Query |
|---|---|
| 1 | How often are latency limits exceeded in network id 192? |
| 2 | When did auto healing last occur in network 6651? |
| 3 | What was the maximum number of users on a network 3377 yesterday? |
| 4 | Generate a histogram of number of sessions established daily on a network 544 over the last two months. |

9. Transportation Use Case

Table 4 lists a number of natural language queries that can be supported in a transportation management environment.

TABLE 4

| No. | Query |
|---|---|
| 1 | What is the total tonnage transported by the vehicle id 5311? |
| 2 | Where is vehicle 5311 right now? |
| 3 | How many vehicles are currently near zip code 97204? |
| 4 | When was the last maintenance performed on vehicle 7220? |

10. Advantages Over Non-NLP Approaches

Because they leverage the power of NLP, the disclosed technologies also provide significant advantages over non-NLP approaches to the underlying problem, namely providing non-specialist user interfaces for database queries. For example, a common browser style of interface can utilize drop-down menus and text boxes for a user to enter query parameters. However, as the scope of available queries increases, this interface style can have menus that are many levels deep, or that have hundreds or thousands of selectable options. Such a complex interface can be susceptible to errors in user input and, contrary to its original objective, can itself require significant training. Even on fairly simple websites, it is very common for users to ask where a particular webpage or facility can be found. In short, the power and scale of queries which can be supported by a modern database dwarfs the practical limits of a browser-style of menu interface.

Interactive voice response (IVR) systems can also utilize a menu structure, but suffer all the drawbacks of the browser style of menu interface, with the added disadvantage of users having to listen to lengthy lists of menu options. Like menu navigation, IVR does not scale well to complex systems.

None of these non-NLP alternatives offer the ease of use possible with the disclosed technologies, which allow the full power of NLP engines to be coupled with the full power of database technologies, as indicated by the use cases above. Users do not need to learn any interface, and do not need to engage with a cumbersome menu structure. Rather, with the disclosed technologies, users can interact intuitively with very complex and powerful database backends.

Terminology

The usage and meaning of all quoted terms in this section applies throughout this disclosure unless clearly indicated otherwise or repugnant to the context. The terminology below extends to related word forms.

The term "add" refers to joining one or more items with one or more like items, or incorporating the one or more items into a container of such items. The container can initially be empty. Particularly, a field or its value can be added to a query data structure, a string can be added to a filter or to a query string, or a rule can be added to a ruleset. Two sets or groups of items can be added together to form a larger set or group of items.

An "application" or "software application" is a computer-executable program performing functions for one or more clients, and can be distinct from an operating system, a software library, a test suite, or a development environment. Additionally, some applications can operate without clients, e.g. launched by a supervisor or another application, performing tasks autonomously or in an event-driven mode. An application can include both executable instructions (dubbed "code" or "program code") and non-executable data (dubbed "application data" or "program data"). A software application can include one or more software processes and can be executed on a single computer or distributed over multiple computing systems.

An "application programming interface" (API), or "interface" for short, can define calling syntax for one or more methods of a software application such as a database engine.

A "bridge" is a software application that has respective ports coupled to two or more other external software applications, such that input to the bridge from a first external application can result in output from the bridge to a second external application. Some examples of the disclosed technology have two ports coupled to an NLP engine and a database engine respectively, providing unidirectional dataflow from the NLP engine to the database engine, however these are not requirements. A bridge can have more than two ports, or can provide bidirectional dataflow. Particularly, a disclosed bridge module can receive inputs from a plurality of NLP engines, or can provide outputs to a plurality of database engines (described further below, e.g. in the context of FIG. 8).

"Call" refers to invocation of a software function or service. Some calls described herein include calls to functions that are part of rules, or calls to services of a database engine.

A "client" is a hardware or software computing entity that uses a resource provided by another hardware or software computing entity dubbed a "server".

The unqualified term "data" refers to any digital representation of information.

The term "database" (also, "database environment") refers to an organized collection of data maintained on computer-readable media and accessible by execution of instructions at one or more processors. Databases can be relational, in-memory or on disk, hierarchical or non-hierarchical, or any other type of database. A database can include a store of data coupled to software (dubbed "database engine") configured to perform operations on or with the stored data. The functionality of a database engine can be exposed to clients through an interface. Examples of a database interface can include, without limitation, an API, a web service, a browser interface, a console interface, or another user interface. In some examples, the disclosed technologies interface with OData-compliant web services of a database engine, but this is not a requirement.

A "datatype" is a definition or specification of a type of data object. A datatype can be simple or primitive, meaning that it is not composed of smaller entities. Logical or Boolean variables, integers, and floating point variables are primitive datatypes in many computer languages. Likewise, many computer languages have either characters or strings as primitive datatypes. Complex datatypes can be composed of smaller entities, which can be simple datatypes or other complex datatypes.

A "data structure" is a collection of values for respective fields, and can also include "undefined" fields for which no value has been defined. Fields having values are dubbed "defined". An undefined field can be encoded with a Null byte or in another way. Some data structures of interest in this disclosure are query data structures. A data structure can be extensible, meaning that new fields can be added to it, or variable, meaning that fields can be added or deleted. Adding or deleting a field can change the number of fields in the data structure, and is different from assigning a value to a previously undefined field or modifying a previously defined field to be undefined.

The term "engine" refers to a software application that can provide one service, or multiple related services, responsive to a succession of inputs from one or more clients. For example, a database engine can provide query handling for a database. An NLP engine can extract structure (in particular, a query data structure) from natural language input (in particular, a natural language query).

An "exception" is a condition detected during execution of software instructions that disrupts the normal flow of the software instructions. An exception can be an indication of an error encountered during software execution. Exceptions can include: a failure to produce any result; a failure to produce a result having a confidence above a threshold; an absence of required input data; or a variable being outside its permitted range.

A "fallback code" is metadata included within a query data structure to indicate a processing status, such as a condition code or an exception encountered during processing. The fallback code can initially be incorporated in a query structure, output from an NLP engine, to indicate any exceptions encountered during NLP analysis of an original natural language query. For example, fallback code set to 1 can indicate that the NLP engine was unable to determine the intent of the query, and can default to 0 when no exception was encountered by the NLP engine. The fallback code can be further utilized during processing of a query structure by a bridge module, to indicate further conditions encountered. Some fallback codes can indicate fatal conditions where the query cannot be fulfilled, in which case an error message can be returned to the client or to a supervisory host console. However, other fallback codes can indicate less critical conditions where query processing can proceed, albeit in a suboptimal way, such as with a generic or default parameter or sub-intent. The name "fallback" code derives from this usage to route a query handling to a backup method. To illustrate, a fallback code can indicate that a bank transaction query specified a date that lies in the future, in which case the query processing can ignore the future date in the query structure, proceeding instead with default date settings such as "past thirty days". Similarly, if a sub-intent (e.g. query-by-account number) cannot be unambiguously determined, a generic query destination (e.g. transaction-query-handler) can perform a less efficient generic database retrieval using available query parameters, instead of an efficient pinpoint retrieval using the account-number key.

A "field" is a member of a datatype or data structure (e.g. a query data structure or a record in a database) having a particular role. A field can have a value, or can be undefined.

A "field specification" defines a condition or pattern for a set of one or more fields. The field specification can require that each of the included fields be defined, undefined, or have some value(s). The notation ⟨F, X⟩ indicates that a field F has value or state X. A field specification {⟨F1, X1⟩, ⟨F2, X2⟩⟨F3, X3⟩} means that a candidate query structure should satisfy all clauses of the field specification in order to obtain a match. To illustrate with fields F1, F2, F3 and a value V3, the field specification {⟨F1, Defined⟩, ⟨F2, Undefined⟩, ⟨F3, V3⟩} can require that F1 be defined, F2 be undefined, and F3 has the value V3. In the context of query data structures and rules, this field specification can be met by a query data structure QA having F1 defined, F2 undefined, and F3 with value V3. A second query structure QB for which F1 is undefined can be found not to match the field specification, irrespective of the state of F2, F3 in query structure QB. Likewise, query structures with F2 defined, F3 undefined, or F3 having another value distinct from V3 can also be found not to match the field specification. For simplicity, ⟨F1⟩ can be used as short form for ⟨F1, Defined⟩.

A "filter" is a specification of one or more arguments for a query to a database engine. A filter can be a string encoding output query parameters. The output query parameters or the filter can be determined by a disclosed bridge module.

A "function" is an executable software module that, when executed, takes an input and generates a corresponding output. The input and output can be of a same or different datatypes, and these datatypes can be simple or complex datatypes, in any combination.

A "hash function" is a function that converts inputs (dubbed "keys") of varying sizes to outputs having a fixed size in memory or a fixed number of bytes. The output can be a string, integer, or another binary value. The output of a hash function on a given key or keys is dubbed the "hash", "hash code", or "hash value" of the key(s). The hash code can be used as an index into an array (dubbed "hash map array"), which stores values for corresponding keys, to obtain the stored value (dubbed "map value") corresponding to instant input key(s). A combination of a hash map array and a hash function is dubbed a "hash map". In some examples, the hash map array and the hash function of a hash map can be implemented as a single data structure.

An "intent" is a term of art denoting a primary classification of a natural language input (such as a query) which indicates a purpose or goal of the input (query). The intent can be output by an NLP engine in response to an input natural language query. Different queries having a common intent can be implemented in different ways, with different query destinations. For this reason, examples of the disclosed technologies introduce a "sub-intent" which can be a secondary classification, within the instant intent, which can be organized according to the precise query destinations for handling respective queries. In some cases, two queries having a common sub-intent can be handled by the same query destination, however this is not a requirement and, in other cases, a same sub-intent can be handled by multiple query destinations. To illustrate, weather data records more recent than 2005 can be stored in a modern database environment, while earlier data records can be stored in a legacy database. Accordingly, a query for 1997 snowfall can be directed to a different query destination than a query for 2012 snowfall, even though the queries are substantially similar and have a same sub-intent. In such cases, determination of a query destination can be dependent on both the sub-intent and a query parameter indicating the year for which the query is being made. However, in other examples, different sub-intents can be defined for pre-2005 and post-2005 queries, and a 1:1 correspondence between sub-intent and query destination can be maintained. In further cases, two queries having different sub-intents can be handled by different query destinations, however this is not a requirement and, in other cases, a single query destination can handle multiple sub-intents. To illustrate, requests for wind speed or precipitation on a given day can have different sub-intents, but can be handled by a same service (i.e. same query destination) that can retrieve individual items of archived weather data for various fields including precipitation and wind speed. However, in other examples, a common sub-intent (e.g. Get_Weather_Parameter_by_Day) can be used for both wind speed and precipitation queries, and a 1:1 correspondence between sub-intent and query destination can be maintained.

An "intrinsic" service of a software application (such as a database engine) is a service that is common to a standard installation of the software application. Intrinsic services of a database engine can include SQL queries, core data services, generation or consumption of views, and certain aggregation operations that can be performed on retrieved data. Intrinsic aggregation operations can include, without limitation: count (of returned records), various averages, minimum, maximum, sum, or standard deviation. In contrast, an "extrinsic" service is a service that can be absent in standard installations of the software application. Extrinsic services for a database engine can variously be obtained from a primary vendor of the database engine or a partner of the primary vendor, or can be custom-developed by or for a database customer. Examples of extrinsic services include, without limitation, fuzzy search (e.g. for imprecise names), or various machine-learning based tools for classification, prediction, or other analysis capabilities. Although, for efficiency, software for extrinsic services can be installed in a database layer of a database environment, this is not a requirement. In other examples, extrinsic services can be implemented by modules running in the application layer, or even running external to the database environment.

The term "machine learning" (ML) is used to characterize a tool, implemented by software in a computing environment, having a particular task for which its performance can improve from experience without being explicitly programmed with any attendant improvements in logic. "Training data", often comprising inputs and corresponding correct or desired outputs, refers to a corpus of data with which an ML tool can improve its performance for the particular task, and "training" refers to a process for improving the performance of the ML tool. The qualifier "trained" indicates that an ML tool has undergone training to attain at least a threshold level of performance, but does not preclude further training of the ML tool. ML tools can perform tasks such as classification, regression, prediction, or factor analysis Examples of ML tools can include, without limitation, neural networks, decision trees, random forests, and support vector machines. Inputs to an ML tool can be dubbed "features". In some examples described herein, features can be organized as a vector or other data structure representing attributes of a parse tree.

A "match" is an indication that a predetermined condition between two data objects is satisfied. In some examples of the disclosed technologies, a query data structure matches a rule if a field specification of the rule is satisfied by the query data structure.

A "named entity" is a term of art referring to a word or sequence of words having a specific meaning in a knowledge domain. Knowledge domains of interest in this disclosure include various commercial, manufacturing, or scientific domains. In some examples of the disclosed technologies, named entities can be recognized from tokens in a query. A named entity having a specific meaning does not preclude it from having additional distinct specific meanings in the same knowledge domain. That is, multiple named entities in a given knowledge domain can be represented by the same text. Other uses of the word "entity" are according to its plain English meaning.

A "natural language" is a form of encoded communication among humans that has evolved through spoken or written usage over time. Thus, natural languages are distinguished from computer programming languages, constructed languages such as Esperanto, codes such as Morse code, or machine-to-machine communication codes such as used for telephony, data communication, or wireless communication. Arabic, Bengali, Chinese (e.g., Mandarin), English, French, German, Hausa, Hindi, Japanese, Korean, Malay, Persian, Portuguese, Quechua, Russian, Spanish, in their various regional variations and dialects, are all natural languages, along with a multitude of other well-known and less common languages. While examples of natural language text in this disclosure are in the form of electronic text, this is not a requirement—a natural language query can be input as speech and converted to text, for processing in some of the disclosed methods. The term natural language also does not preclude rendering or representing a natural language message by electronic means, such as entry at a keyboard, storage as an ASCII or Unicode character set, display on a computer monitor, or rendition to speech by a text-to-speech device.

"Natural language processing" (NLP) refers to processing natural language by software on a computer. One phase of NLP can involve categorization of text tokens. Categorization can use a variety of tools (with respective rules) including, without limitation: a "lexical rule", which can identify known words and replace them with corresponding standard tokens; an "annotator", which can recognize word patterns and assign standard tokens to one or more of the words in the pattern; a "named entity recognition", which can recognize named entities and replace them with corresponding standard tokens. The categorized tokens can have respective semantic functions. Another phase of NLP can involve parsing, in particular, to generate a tree (dubbed a "parse tree") representing the input text. A root node of a parse tree represents the entire input text, and leaf nodes of the parse tree represent individual tokens. Bottom-up categorization of the input text can be used to identify multiple candidate parse trees. A "feature function" can be used to score each candidate parse tree. In some examples, features can be the number of times each available rule was used during categorization, and the feature function can evaluate a weighted sum of the features. Weights for the weighted sum can be predetermined, or can be learned by machine learning on a training dataset. A third phase of NLP can be extraction of the semantic content from the selected parse tree, which can be accomplished by top-down evaluation of the semantic functions in the selected parse tree. Evaluation of the semantic functions can result in values (derived from tokens of the natural language query) being assigned to respective fields of a query data structure. In some examples, the query data structure can be output to a bridge module.

A "notification" is a message for which a substantive response is not required, or for which no specific action is required.

"OData" refers to the Open Data Protocol standard presently published by the Organization for the Advancement of Structured Information Standards (OASIS).

"Preprocessing" refers to operations applied to received text (e.g. in a natural language query) to prepare the received text for subsequent processing. Exemplary preprocessing operations can include, without limitation, removing unwanted characters, applying spell-check, or case conversion.

"Top-down" and "bottom-up" refer to methods of traversing or processing a graph having a unique root node. Bottom-up refers to starting at edges of the graph (away from the root node) and working towards the root node, while top-down refers to starting at the root node and working towards the edges of the graph.

The term "parse" refers to an operation of traversing a sequence of text tokens to identify, categorize, or extract one or more of the tokens.

An "order" is a set of pairwise binary relations among members of a set. In this disclosure, rules of a ruleset can have an order. A "total order" (also, "linear order") is when the members of the set can be thought of as arranged along a line, such that every pair of members has a binary relation (e.g. A precedes or follows B). A "partial order" is when the members of the set can be thought of as forming a directed acyclic graph (DAG). In a partial order, at least one pair of members has a binary relation defined, while other pairs of members may not have a binary relation defined.

A "query" is a request for information, such as information contained within a database environment. Some queries of interest in this disclosure are "natural language queries" which can be in the form of a body of text. Although a natural language query can be a syntactically correct, complete sentence, formed as a question, none of these (correct syntax, complete sentence, formed as a question) is a requirement. A natural language query can be a sequence of tokens that is not formed as a question, is not a complete sentence, or violates syntax rules of its natural language. In some examples of the disclosed technologies, a query can be represented in a structured form, as a query data structure, or as a string (a "query string") conforming with an exposed interface of a database engine. NLP analysis of a query can identify a primary purpose of the query (dubbed "intent") as well as other information (dubbed "query parameters") that define particulars of the information being requested by the query. The acts of retrieving any required data, analyzing the retrieved data as needed to determine the requested information, and responding to the query with the requested information, are collectively dubbed "fulfillment" of the query. A query "result" refers to the requested information. A "span" of a natural language query can be a substring of the query, indexed by first and last tokens. Thus, span (2, 3) of a query "List all dormant accounts" can resolve to "all dormant".

A "query data structure" (sometimes, simply "query structure") is a data structure that represents a query in a structured form. A query data structure can be implemented in JavaScript Object Notation (JSON), Extensible Markup Language (XML), in another markup language, or in binary form.

A "query destination" is a specific function of a database engine that can handle an instant query. A query destination can be a web service. The address of a query destination can include an address of a "service root" which uniquely identifies a particular database engine or interface, and a name or handle of a specific function or service at that service root. The address of a query destination can be dubbed a "base record locator", through which various database records can be retrieved, according to various parameters passed to the query destination.

In the context of data transfer between hardware or software entities, the terms "receive" and "transmit" refer to communication over a network, which can be in the form of a message. The communication can be electromagnetic, e.g. over wired, wireless, or optical media, but this is not a requirement.

A "rule" is a software object defining a condition and an action. Given some input data, a rule can be processed to determine whether the condition is satisfied and, if the condition is satisfied, to perform the action. A rule can include data (defining the condition) and one or more executable functions (defining the action). In some examples, the condition can be a field specification, and the action can be performed if a query data structure matches the field specification. The action can include a parameter transformation function or a filter generation function.

A "ruleset" is a collection of rules. A ruleset can be ordered. A linearly ordered ruleset can be processed sequentially from a starting rule to a terminating rule. Processing of a ruleset can terminate before all rules have been processed. A partially ordered ruleset can be processed in a conditional sequence, where evaluation of a given rule can determine which rule to process next. A partially ordered ruleset can have a root rule, with which processing begins.

A "server" is a computing system, implemented as hardware on which software is executed, providing one or more services or access to one or more resources for at least one client, and often for a plurality of clients. In this disclosure, servers can host software applications, such as bridge modules, NLP engines, or database engines, or can provide other functions.

"Software" refers to computer-executable programs or instructions and associated data structures. Software can be in active or quiescent states. In an active state, software can be loaded into memory or undergoing execution by one or more processors. In a quiescent state, software can be stored on computer-readable media, awaiting transmission or execution. Software can be organized as a "module", containing one or more functions and associated data directed to a common task or group of related tasks.

A "store" or "repository" is a data storage entity. The term store can be qualified by a type of data stored therein.

A "string" is a sequence of characters. Some strings of interest in this disclosure are a "query string", which can be used to transmit a query to a database engine, and a "filter string", which can encode one or more query parameters in a query string.

"Text" is a representation of one or more words (e.g. "apple"), or printable characters (e.g. "Jan. 1, 2020"), which convey semantic meaning. While text can often be an electronic representation, this is not a requirement, and some examples of text herein can originate in audio (e.g. spoken) or paper (e.g. handwritten or typed) forms. Electronic text can be stored in memory or on a storage device, with suitable encoding, and can also be encrypted.

A "token" is an atomic component of a body of text. Commonly, a token can be a word. The body of text can be an input query in a natural language, which can be free form text, with or without punctuation.

A "token" is a data item representing one or more portions of a body of text such as a query. Commonly, a "simple token" can represent a word or other sequence of printable characters delimited by whitespace or punctuation, however this is not a requirement. Some tokens (e.g. dates or hyphenated names) can represent character strings which include certain punctuation symbols. Some tokens can represent a named entity recognized in text. Some tokens can represent combinations of words or other smaller tokens. A token can have a semantic value which is at least partly based on the original text represented by the token.

A "tuple" is an ordered collection of two or more members. The members of a tuple can be data items with same or different datatypes (which can be atomic or complex datatypes), functions (or pointers to functions), or even other tuples. A "pair" is a tuple with two members and a "triple" is a tuple with three members. A counterpart to a tuple, having a single member, is a "singlet", which is not a tuple. In some examples, a rule can be implemented as a pair or a triple. A tuple can be represented in angle brackets, e.g. ⟨A, B, C⟩.

A "web service" is a service provided by a server (such as a database engine) that can be accessed by a client (such as a bridge module) using an internet protocol. Some web services described herein can be accessed using an OData protocol, however this is not a requirement.

A "word" is a sequence of consecutive characters from a predetermined alphabet. A "word" can be a basic unit of human language, having one or a finite number of semantic meanings that are absent in smaller portions of the word. Commonly, the predetermined alphabet in English includes lower-case and upper-case letters. Other languages can have similar alphabets, and some can include character modifiers and modified character forms. Often, the predetermined alphabet can include numerals (0-9) or certain punctuation marks (e.g. "_", "-", "$", "#", "+", "=", ">", "<", or "/") while excluding other punctuation marks (e.g. ",", ";", ":", ".", "?", "!") which, along with whitespace, can be treated as delimiters.

Example Bridge

FIG. 1 is a diagram 100 illustrating an example of bridging between an NLP engine and a database engine according to the disclosed technologies. This example illustrates the role of a disclosed bridge to complete automated processing of a client's natural language query.

Initially, client 102 can issue a natural language query 104 which can be forwarded as input to an NLP engine 112. NLP engine can employ a variety of techniques, described further herein, to extract and output a query data structure 114 from the natural language query 104. In some examples, query structure 114 can include an intent and query parameters corresponding to the natural language query 104. Bridge module 152 can analyze query structure 114 to generate a database query 154 which can be transmitted to database engine 182. Database engine 182 can process the database query 154 and can produce a response 184, which can be returned to requesting client 182.

Numerous variations and extensions can be implemented within the scope of the disclosed technology. For example, FIG. 1 shows data objects circulating in a ring, from the issued query 104 to the received response 184, however this is not a requirement. In other examples, one or more hosts can mediate the communications represented in FIG. 1. For example, natural language query 104 can be transmitted from client 102 to the host, the host can forward the query 104 to NLP engine 112 and receive query structure 114 in response, and so forth, so that the communications of FIG. 1 flow in a hub-and-spoke configuration, with the host acting as the hub. Such a configuration can be advantageous where multiple engines 112, 182, or bridge modules 152, are present, or there are different numbers of each, so that the host can perform routing or load balancing among the attached resources 112, 152, 182. As another variation, the bridge module 152 can be integrated with the database engine 182, or with the NLP engine 152, on a common computing platform, for efficiency.

First Example Method

Figure 2:
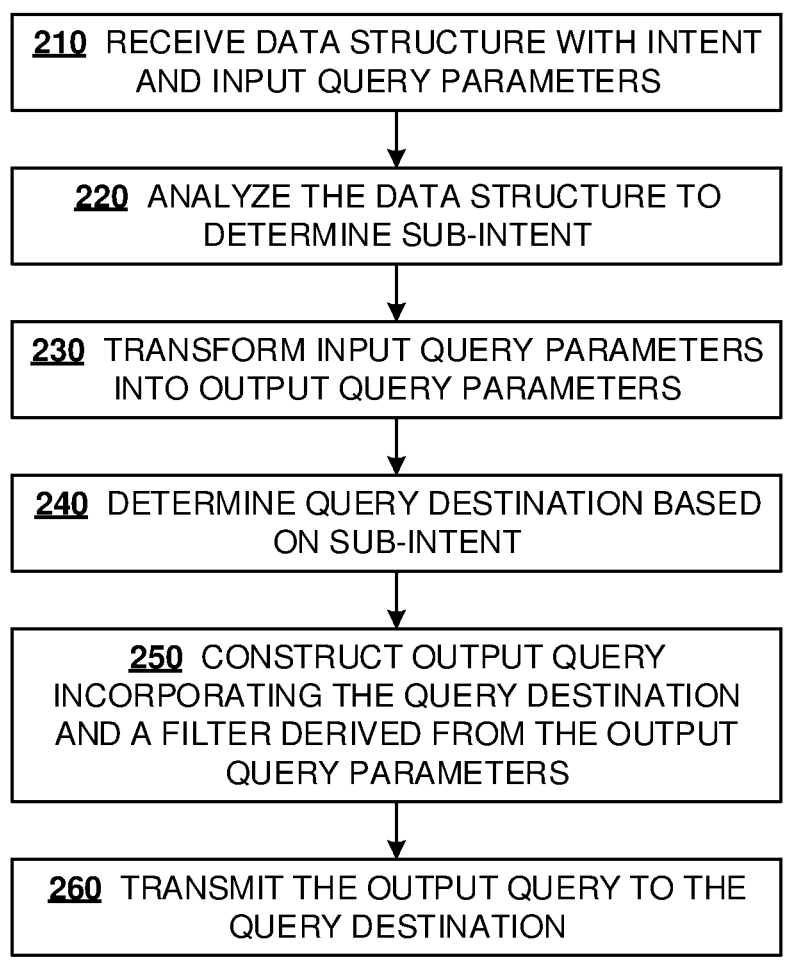
FIG. 2 is a flowchart of a first example method for implementing disclosed technologies.

FIG. 2 is a flowchart 200 of an example method for implementing disclosed technologies. In this method, a data structure representing a query is received and analyzed, leading to transmission of an output query to a suitable query destination.

At process block 210, a data structure can be received, containing an intent and input query parameters that have been extracted from a natural language query. At process block 220, the data structure can be analyzed to determine a sub-intent for the query. At process block 230, a set of the input query parameters can be transformed into a set of output query parameters.

At process block 240, the sub-intent can be used to determine a query destination. For example, some queries can be directed to a built-in function of a database system, and can be handled by database views, or other core database services. Other queries can be directed to add-on functions of the database system, which can perform fuzzy search on the database or can make inferences from selected database records.

At process block 250, an output query can be constructed, including the query destination and a filter derived from the set of output query parameters. At process block 260, the output query can be transmitted to the query destination.

Numerous variations and extensions can be implemented. In some examples, multiple sub-intents or query destinations can be suitable for a given query, and a selection can be made among such candidates. Exception conditions can be encountered and a fallback code can be written to the data structure. Previously written fallback codes can guide the processing of the data structure.

Example Rule

Figure 3:
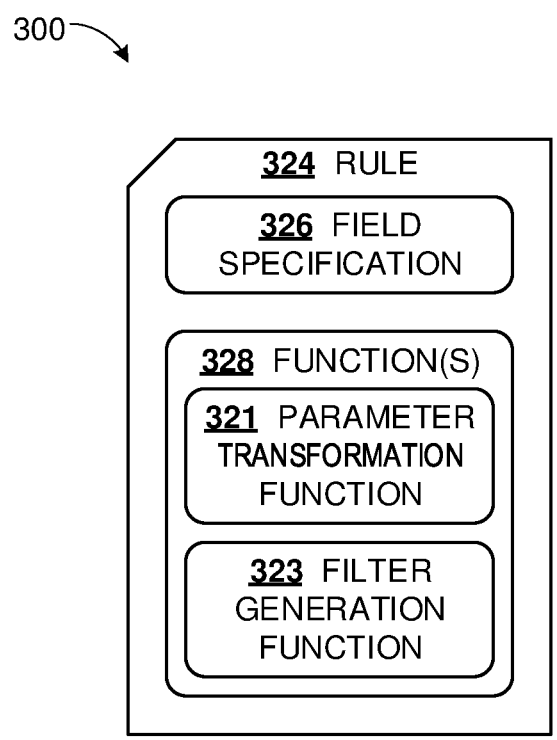
FIG. 3 is a diagram illustrating an example rule according to the disclosed technologies.

FIG. 3 is a diagram 300 illustrating an example rule according to the disclosed technologies. Rule 324 can include a field specification 326 and one or more functions 328. Field specification 326 can contain one or more entries corresponding to fields of a query data structure. In some examples, the entries can represent fields that are required to be defined in a matching query data structure. To illustrate, consider a query structure D having only fields F1, F2, F3 defined, and a Null value for field F4 indicating that F4 was not defined in the original natural language query. Then, a field specification listing two fields {⟨F1⟩, ⟨F2⟩} can match the query structure D, while a field specification {⟨F1⟩, ⟨F4⟩} can be skipped as not matching, since the query structure D lacks a definition for F4. In other examples, one or more entries can specify a value or values for the corresponding field, e.g. ⟨F1, V1⟩ can be an entry specifying that, in order to match the field specification, a query data structure should have value V1 for field F1. Multiple matching values can be specified, either as a set (e.g. ⟨"State", {"Alaska", "Arizona", "Arkansas"}⟩ to match queries specifying one of these three states), as a range (e.g. ⟨"Date", ⟨Jan. 1, 1960, Jul. 25, 1983⟩⟩ to match queries targeted within a supported range of dates), or using wildcard characters (e.g. ⟨"Zip Code", "972*"⟩ to match queries targeting a zip code prefix for Portland, Oreg. In further examples, a rule can handle a case where a particular field is undefined, To illustrate, a corresponding entry in the field specification 326 of rule 324 can be ⟨"City", Undefined⟩ to indicate that a matching natural language query does not specify a value for "City".

The functions 328 can define actions to be performed when a query data structure D matches the field specification 324. Two examples of functions 328 are illustrated, parameter transformation function 321 and filter generation function 323. In some examples, a rule can be a triple ⟨Field specification 324, Parameter transformation function 321, Filter generation function 323⟩, with both functions 321, 323 defined, or one defined and one undefined.

Parameter transformation function 321 can make changes to a set of query parameters, such as deleting unnecessary parameters, parsing a parameter into simpler units, or constructing a parameter not expressly present in query data structure D. To illustrate, if a requester's account number is specified in a query, other information such as the requester's name can be superfluous and can be deleted, because the account number is sufficient to accurately process the query. As another illustration, query structure D can contain two distinct fields first name "William" and last name "Johnson" (but no account number), while the query target can expect a single field. In this illustration, parameter transformation function 321 can combine the first name and last name into a single field titled "Name" with value "William Johnson". In a further illustration, a single field "Street Address" with value "22 Main St." in query structure D can be parsed into multiple fields "Street Number" with value 22 and "Street Name" with value "Main St.". In yet another illustration, the input query can specify a zip code "97204", while the query target can expect "City" and "State" fields not present in the natural language query. Accordingly, parameter transformation function 321 can look up the zip code in a directory to ascertain the "City" and "State". Field specifications for such a rule can be {⟨"Sub-intent", "Property Record"⟩, ⟨"Zip code", Defined⟩, ⟨"City", Undefined⟩} or {⟨"Sub-intent", "Property Record"⟩, ⟨"Zip code", Defined⟩, ⟨"State", Undefined⟩}. The operations required for such parameter transformation functions can include over-writing or deletion of field values in query structure D, marking field values as Undefined (e.g. by setting value equal to a Null character), deletion of query structure fields, tokenization of field values based on spaces or other delimiters, or directory lookups.

In some instances, executing a parameter transformation function can update existing fields of a query data structure, while in other instances fields may need to be deleted or added. Thus, if First_Name and Last_Name field values are combined into a single Name field, a new Name field can be added, and the original First_Name and Last_Name fields can be deleted from the query data structure. In other examples, the First_Name and Last_Name fields can be set to Null, or otherwise marked Undefined.

Parameter transformation functions can also support field renaming, e.g. in cases where there is a given field has distinct names in the NLP engine and in the database engine. To illustrate, a field named "Customer ID" in the NLP engine can map to "Client ID" at the database engine. Even in environments where the field names are initially matched on both sides, re-engineering on one side (e.g. database engine) can result in a name change. Handling name changes within the bridge module can be considerably easier than re-engineering the NLP engine to match the change at the database engine. In other examples, a database engine may receive queries originating with two distinct NLP engines using different naming. Here too, renaming a field can readily provide compatibility with both NLP engines concurrently.

Identification of sub-intent can be a special case of a parameter transformation function 321, as a new field for "Sub-intent" can be added to the query data structure, and assigned a value based on the matched field specification. For example, a query for a bank transaction specifying an account number can match a field specification {⟨Intent, "Transaction"⟩, ⟨Account_Number, Defined⟩ } can indicate that a query by Account_Number can be performed (even if other search keys, such as Name, are present), and a field "Sub-Intent" with value equal to TransactionByAcctNum can be added to the query data structure. In other examples, assignment of sub-intent can be performed by a dedicated function 328.

A filter generation function 323 can generate strings out of which a query filter can be assembled. The string can be generated in a specific format expected by a query target. Thus, depending on the exposed interface of an instant query target, a name can be encoded as a string "Name eq "William Johnson"" or "f_name='William', l_name='Johnson'". In some examples, strings can be appended to a common filter string as successive filter generation functions 323 are executed, which can be more efficient than storing each constituent string, to be retrieved and assembled with other constituent strings at a later time. In other examples, filter strings can be constructed and stored separately for respective fields, and assembled together with a base record locator at the time of preparing the complete query string. This approach can be advantageous in embodiments where query parameters are subject to deletion or modification during rule processing. Only filter strings from final output query parameters can be incorporated into the completed query string, without having to detect and address situations where a common filter string may incorporate an earlier filter string that has been updated or is no longer required.

For a given sub-intent, the functions 328 can be collected within one rule 324 or distributed among multiple rules 324. To illustrate, consider a query structure specifying fields F1, F2, F3, where fields ⟨F1⟩, ⟨F2⟩ are required for a given sub-intent S1 and F3 is superfluous. In some examples, a single rule 324 can assign sub-intent as a new field F4 and mark field F3 as Undefined. Alternatively, a first rule 324 can identify and add the sub-intent, while a second rule (having a field specification {⟨F1, Defined⟩, ⟨F2, Defined⟩, ⟨F3, Defined⟩ } or {⟨F4, S1⟩, ⟨F3, Defined⟩}) can have a parameter transformation function 321 that marks F3 as Undefined. In common examples, a given rule 324 can incorporate exactly one parameter transformation function 321 and exactly one filter generation function 323. However, this is not a requirement and, in other examples, a given rule 324 can incorporate zero, or multiple parameter transformation functions 321; or zero, or multiple filter generation functions 323; so long as rule 324 incorporates at least one function. The functions 328 are not restricted to parameter transformation functions 321 or filter generator functions 323, and other functions can also be incorporated within a rule 324. For example, along with identification of a sub-intent, a rule can also: execute a function to determine the query target; check status of multiple alternative destinations to which the query can be directed; or select a next rule to be processed.

In further examples, a function 328 can validate the query parameters. To illustrate, a function 328 can verify that Zip Code or Account Number values are valid. The validation can also be dependent on the sub-intent or query target. Thus, a natural language query "What is the balance of State Bank account SAV0051533?" can have a valid account number for State Bank, while the same account number can be invalid in "What is the balance of National Bank account SAV0051533?" because National Bank could employ a different format for its account numbers.

In some examples, any of functions 328 can read a fallback code or set the fallback code. For example, a fallback code can indicate an ambiguity in an account number field. To illustrate, a natural language query could include two numbers that could reasonably be identified as the account number (e.g. an inconsistency in the natural language query text "What is the balance for William Johnson, account number 3579, once again that's account 2579"). In such a case, the rule processing can treat the query as query-by-name instead of query-by-account-number which would otherwise be preferred.

Ordering of Rules

In some examples, a ruleset can be maintained in a linear order, such that the order in which rules are evaluated is predetermined. In other examples, the successor to a given rule can be conditional based on the result of evaluation of the given rule. To illustrate, if the field specification of a given rule matches a query structure, then the sub-intent can be identified from the given rule and further rules testing for other sub-intents can be bypassed. Conversely if the given rule is not a match, subsequent rules to evaluate functions or conditions specific to that sub-intent can be skipped. Conditional evaluation of rules can be according to a partial order, for which the rules can be organized as a directed acyclic graph (DAG) or, in some cases, as a tree.

Ordering of rules 324 in a ruleset can support preferences among sub-intents, in some cases where multiple sub-intents could match a given query data structure. To illustrate, an account number query can be precise and can be implemented using intrinsic functions of a database environment. In contrast, a query-by-name can be subject to imprecision in name spelling, or having multiple accounts or customers with a same name, and can require use of extrinsic database functions for e.g. a fuzzy search. Accordingly, query-by-account-number can be preferred over query-by-name. This can be achieved by (i) ordering a ruleset so that query-by-account-number is tested first, (ii) deleting superfluous field values (e.g. for a Name field) from the query structure, so that (iii) later, when the rule for query-by-name is checked, the Name field is undefined and the field specification is not matched. In examples using partial ordering, after query-by-account-number has been identified, the path of rule evaluation can omit (iii) checking for query-by-name, and accordingly (ii) deleting a superfluous Name can also be omitted.

Example of a Query Data Structure

FIG. 4 is a diagram 400 illustrating transformation of a query data structure. This diagram shows the query data structure 414 as received, e.g. from an NLP engine, alongside the query data structure 474 after processing by a bridge module similar to 152. The illustrated query structures can be generated in response to an original (audio or text) natural language query "Show me the transactions for William Johnson, account 3166, for last month."

The received query structure 414 includes a number of fields, some of which have defined values as indicated, while others are coded as Null to indicate undefined fields. FallBackCode has an integer value 0 indicating that the NLP engine did not encounter any exceptions while processing the original query. The Intent was discovered by the NLP engine as Get_TransInfo, which in this illustration can be a categorical variable. The NLP engine was able to parse the name fields in the original query, to populate the FirstName and LastName fields with the string values shown. Because the original query did not provide a specific TransactionID (e.g. check number 100), the TransactionID field is set to Null, meaning undefined. The Date is defined as a string "Last Month", which can be a named entity. ProgramID and BankInfo are also set to Null (undefined). In other query examples, ProgramID can be used to support e.g. specific types of transactions such as loan payments, payroll deposit, or automated teller machine (ATM) cash withdrawals. BankInfo can specify a particular bank for implementations supporting a shared platform used by multiple banks. Then, Mr. Johnson's account number 3166 is included in field "AccountNum" as extracted from the original query. The Account Status field can be used to support queries e.g. inquiring about dormant accounts or accounts in default, while the Status Reason field can be used to support queries pertaining to particular codes such as insufficient funds or missed payments. Finally, MathOperator can be used to support various aggregation operations, such as Sum (e.g. for "what is the total amount of withdrawals?") or Max (e.g. for "what is the largest deposit?") that can be performed on data retrieved during query handling by a database engine. None of the fields Account Status, Status Reason, or Math Operator are applicable to the present natural language query and, accordingly, all these fields are set to Null. In cases where a MathOperator is defined, a filter generation function can generate a filter string to be included with a query string, to convey to the query destination what information is being requested, e.g. a sum of all transaction amounts for the past month.

Turning to the right side of FIG. 4, query structure 474 is depicted after processing by a bridge module, e.g. by applying one or more rules. A number of fields in query structure 474 are unchanged from query structure 414. These fields have the same meaning as in query structure 414 and are not discussed further.

Query structure 474 includes a new Sub-Intent field. A rule having a field specification {⟨Intent, Get_TransInfo⟩, ⟨AccountNum, Defined⟩} can match query structure 414 and can be used to determine that the original query can be processed as query-by-account-number, coded as a categorical variable AccNumQuery as illustrated. Because a name is not required for this query, the FirstName, LastName field values have been deleted, leaving these fields Undefined and coded as Null. The Date field can be transformed (e.g. by a parameter transformation function) from a relative specification ("Last Month") to an invariant form, with two new fields Date From and Date To added. Presuming that the illustration is from July 2020, these fields are coded as June 1 and June 30 as illustrated. The original Date field is no longer required and has been set to Null, which can also be done by a parameter transformation function.

Working Example of Query Structure Processing

Figure 5A:
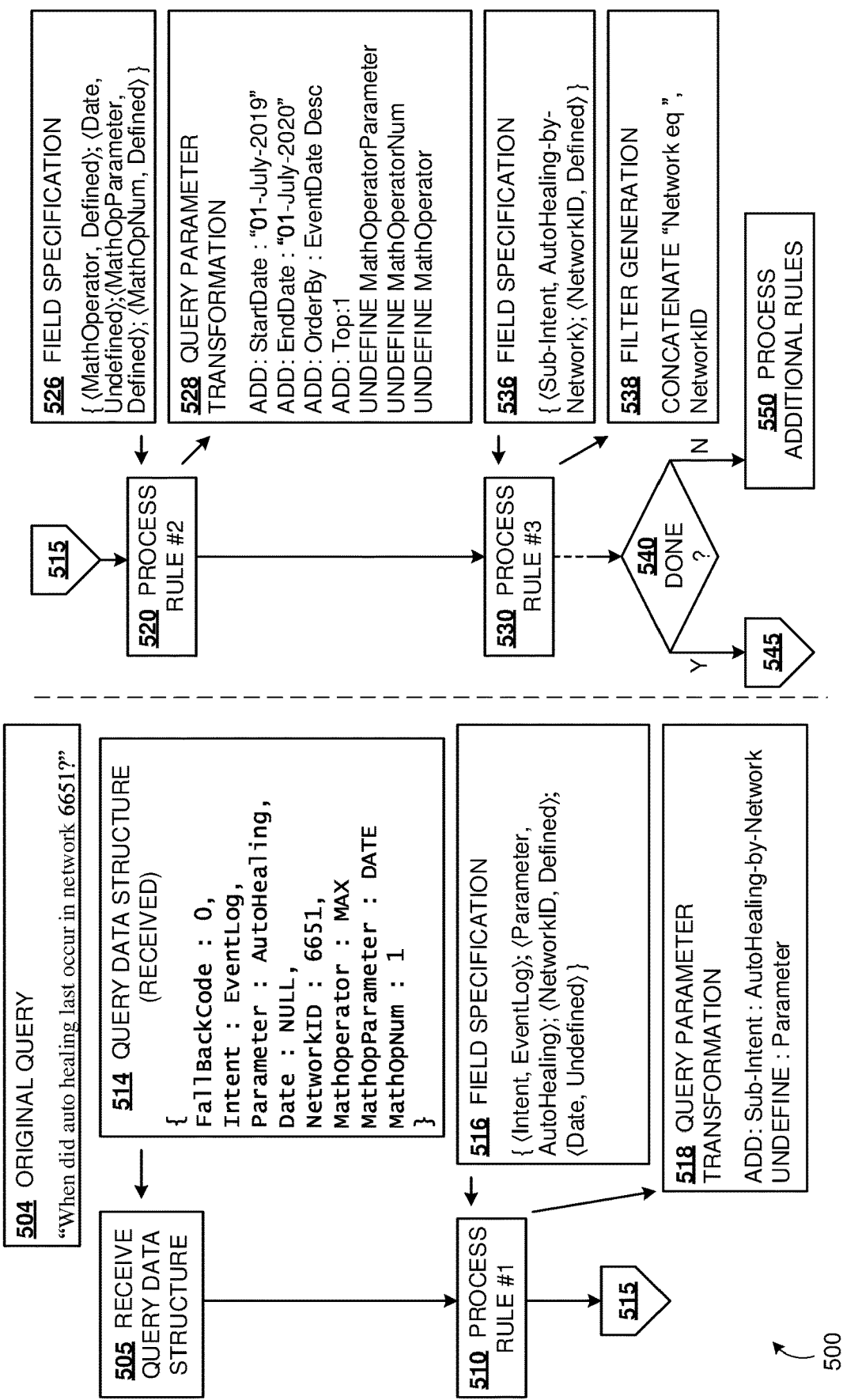
FIGS. 5A-5B are parts of a hybrid diagram of a working example of processing a query data structure according to the disclosed technologies.
Figure 5B:
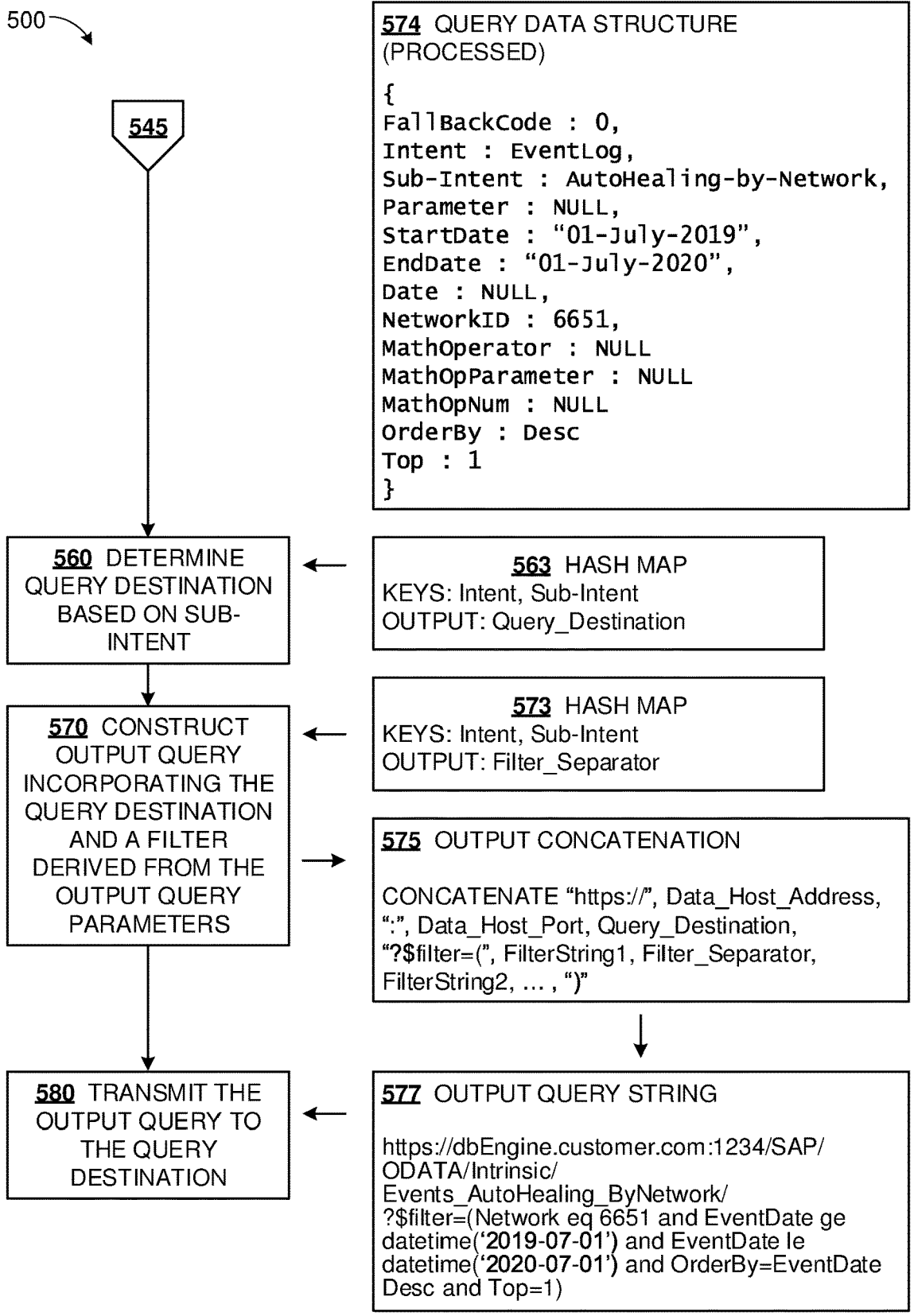

FIGS. 5A-5B are parts of a hybrid diagram of a working example of processing a query data structure according to the disclosed technologies. In this example, various rules are applied to a received query data structure, after which an output query is constructed and transmitted to a database engine. The illustrated query is for a telecom network management environment. The left-hand side of FIGS. 5A-5B comprise a flowchart, including process blocks which can be executed by a disclosed bridge module. The right-hand side shows various field specifications or other data structures, as well as certain operational details of functions executed in the course of the various process blocks.

As an illustrative aid, the original natural language query 504 "When did auto healing last occur in network 6651?" is shown in FIG. 5A. An NLP engine (not shown) can process query 504 to derive a query data structure 514. For clarity of illustration, only fields relevant to this example are shown; query data structure 514 can also have numerous additional values, either defined or undefined. Query structure 514 can be received by a disclosed bridge module at process block 505.

At blocks 510, 520, 530 respective rules are processed. The respective field specifications of these rules 516, 526, 536 are illustrated, and attendant functions 518, 528, 538 are also shown. For clarity of illustration, only a few rules having a match are shown; other rules can also be present and processed.

The field specification 516 of Rule #1 indicates that, in order to obtain a match, the Intent field should be EventLog, indicating that the original query is concerned with logged events, and the Parameter should be AutoHealing, indicating that the query pertains to AutoHealing events (i.e. where a network encounters a fault condition, such as a network node going offline, and undertakes an automatic healing procedure, e.g. by rebuilding a routing table). Additionally, the field specification 516 indicates that a matching query structure should have Date field undefined and NetworkID field defined. Because the query structure 514 satisfies all the conditions of the field specification, block 510 can detect a match between Rule #1 and query structure 514. Accordingly, the functions of Rule #1 can be executed. Function 518 can assign a Sub-Intent to the query and can be implemented as a query parameter transformation. As indicated in FIG. 5A, A Sub-Intent field can be added to the query structure 514, with value set to AutoHealing-byNetwork. Furthermore, the Parameter field can be updated to an Undefined state, because it is superfluous for the assigned Sub-Intent. In this example, field specification 516 includes a ⟨Date, Undefined⟩ clause. One reason for this can be that, with Date defined, an alternate Sub-Intent AutoHealing-byDate can provide more efficient query fulfillment. In other examples, the rules can be ordered such that AutoHealingby-Date is detected first, so that AutoHealing-by-Network is only used if AutoHealing-by-Date fails to generate a match. In such examples, the ⟨Date, Undefined⟩ clause can be omitted from field specification 516.

Following flowchart connector 515, the method proceeds to block 520 for processing of Rule #2. The field specification 526 of Rule #2 indicates that, in order to obtain a match, the MathOperator, MathOpParameter, and MathOpNum fields should be Defined and the Date should be undefined. The query structure 514 (modified by Rule #1) matches field specification 526, so that function 528 of Rule #2 can be executed. This rule pertains to queries where an aggregation operation is to be performed, however no Date is specified. In such a case, default dates can be used, which can be a one-year interval immediately preceding a current date, which is Jul. 1, 2020 in this illustration. Accordingly query parameter transformation function 528 can add StartDate and EndDate fields to query structure 514 with the values indicated. Furthermore, the parameter transformation function 528 can process the values of MathOperator ("MAX"), MathOpParameter ("DATE"), and MathOpNum ("1") fields, which indicate that it is desired to return the requested event entry having highest date value, and only the most recent one entry is needed. Accordingly, at block 528, the three MathOp . . . fields can be replaced by an Order field (for a sort function) having value "EventDate Desc" (for descending date order) and a Top field having value "1" indicating that just one entry of the sorted event entries is required.

Proceeding to Rule #3 at block 530, the field specification 536 of Rule #3 indicates that, in order to obtain a match, the Sub-Intent should be AutoHealing-by-Network and the NetworkID field should be defined. Because both conditions are met by query structure 514 (as modified by Rules #1, #2), the associated function 538 can be executed. Function 538 is a filter generation function, and generates a filter string based on the NetworkID query parameter, namely "Network eq 6651" in this illustration.

Additional rules (not shown) can also be processed. Additional filter strings can also be generated, either from Rules #1-#3 or from additional matching rules. For example, one or more additional rules (not shown) can generate filter strings "OrderBy=EventDate Desc" and "Top=1" for the sorting operations specified at block 526. Eventually (as indicated by dashed arrow), the method can reach decision block 540, where a termination condition can be checked. Ruleset processing can terminate in several ways, including e.g. all rules having been processed, a last processed rule encoding a Done flag, an exception being indicated by the Fallback code, or other logic specific to a Sub-Intent that indicates that all processing required by a particular sub-intent has been completed. In some examples, all actions required to support a detected sub-intent can be handled by functions of a single rule such as Rule #1, and the termination condition can be met immediately after block 510.

If the termination condition has not been met, the method follows the N branch from 540 to block 550, to continue processing additional rules. In the illustrated example, the termination condition is found to be met, and the method can follow the Y branch from decision block 540, via flowchart connector 545, to FIG. 5B.

Initially, FIG. 5B shows the query data structure 574 after rule processing is complete. As described above, the Sub-Intent, StartDate, EndDate, OrderBy, and Top fields have been added, and the Parameter, MathOperator, MathOpParameter, and MathOpNum fields have been set to Null (meaning Undefined).

At block 560, the Intent and Sub-Intent can be mapped to a query destination. As illustrated, a hash map 563 can be used. The hash map 563 can include a hash function and a hash map array. The values of the Intent and Sub-intent fields can be concatenated and hashed (e.g. by the hash function) into a hash code, and the hash code can be used as an index into the hash map array to retrieve the query destination from the indexed location in the hash map array. In other examples, the Intent key can be superfluous, and just the Sub-Intent field value can be used as a key for the hash map 563.

At block 570, output query 577 can be constructed. Because syntax for a filter string can vary according to query destination, another hash map 573 can be used to retrieve a delimiter string (Filter_Separator) to use between filter string clauses. Hash map 573 can include a hash function and a hash map array, with operations similar to those described for hash map 563. In the illustrated example, the Filter_Separator is a five character string "and". In other examples, commas, semicolons or other symbols can be used, with optional spaces on one or both sides of the symbol. Then, output concatenation function 575 can be used to combine various fields to build a complete query string 577 as shown. The components of the illustrated query string 577 include a protocol specifier "https://", a service root address Data_Host_Address (dbEngine.customer.com in the illustration), a port at that address Data_Host_Port (port 1234 in the illustration), the query destination (SAP/OData/Intrinsic/Events_AutoHealing_ByNetwork in the illustration), a filter preamble ("?$filter=(" a succession of filter strings delimited by the Filter Separator string, and a filter termination character (")" in the illustration). Additional filter strings for the StartDate and EndDate, not expressly described above, have also been included.

The Data_Host_Address and Data_Host_Port can be stored as configuration information within the bridge module for examples where queries are all referred to a single database engine. In other examples, where multiple database engines can accept respective queries, the Data_Host_Address and Data_Host_Port arguments can be obtained along with the query destination from hash map 563, or can be part of the query destination string. This query string format is illustrative, and many other protocols and formats can be used within the scope of the disclosed technologies. In some embodiments, the output query string can include a format specifier, such as "&format=JSON".

Finally, at process block 580, the output query string 577 can be transmitted to the query destination using the specified protocol ("https:")

Example Dataflow Diagram

Figure 6:
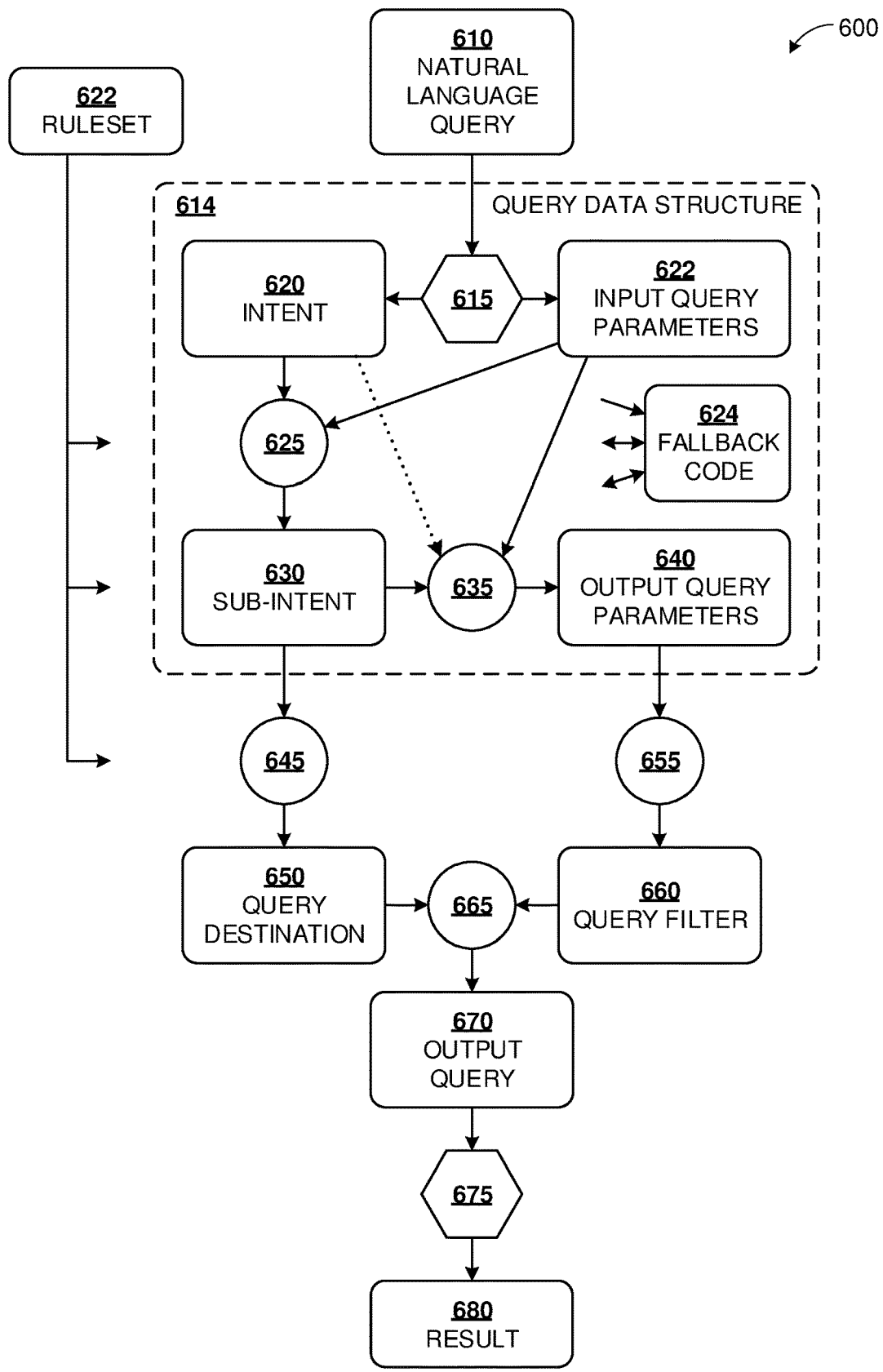
FIG. 6 is a dataflow diagram for some examples of the disclosed technologies.

FIG. 6 is a dataflow diagram 600 for some examples of the disclosed technologies. This diagram 600 illustrates dataflow from an initial natural language query 610, which could be received from a client such as 152, to a query response 680, which could be returned to the requesting client. In FIG. 6, circles are used to denote operations or blocks that can be performed by a disclosed bridge module, while hexagons are used to denote operations or blocks that can be performed by software entities coupled to a bridge module, such as an NLP engine on the input side of the bridge, or a database engine on the output side of the bridge.

Natural language query 610 can be operated on by NLP engine 615 to extract the intent 620 and one or more input query parameters 622 from the natural language query 610. The intent 620 and the input query parameters 622 can be analyzed by process block 625 to identify sub-intent 630. Block 625 can be part of a disclosed bridge module (similar to 152), and can evaluate one or more rules as described herein. The sub-intent 630 and the input query parameters can be inputted to process block 635 to generate the output query parameters 640. Block 635 can also be part of a disclosed bridge module, and can be embodied in one or more parameter transformation functions (similar to 321). In some examples, the intent 620 can also be used as an input to block 635, as shown by dotted arrow in FIG. 6, however this is not a requirement.

Dashed outline 614 indicates those data items of FIG. 6 which can be stored within a query data structure as disclosed herein. Although placed within outline 614 for convenience of illustration, it can be understood that the process blocks 615, 625, 635 are not themselves part of the query data structure 614. That is, query data structure 614 can incorporate fields and values for intent 620 and input query parameters 622, as originally received from NLP engine 615. Query data structure 614 can also be used to store additional data items such as sub-intent 630 and output query parameters 640 which can be obtained by processing within a bridge module. A fallback code 624 can also be stored within the query structure 614, as described further herein.

The sub-intent 630 can be mapped to a query destination 650 by process block 645. In some examples, process block 645 can be integrated within functions such as 328 of one or more rules such as 324, however this is not a requirement. In other examples, a dedicated sub-module (similar to 560) can be used to perform block 645. The output query parameters 640 can be input to block 655 to obtain one or more query filters 660. Block 655 can be part of a disclosed bridge module, and can be embodied in one or more filter generation functions (similar to 323). The query destination and query filter can be processed or combined by block 665 into an output query 670. In some examples, the output query can be a string, such as an HTTP string directed to a web service (specified by the query destination 650) together with parameters encoded in the query filter 660.

The output query 670 can be transmitted to a database engine 675, for processing by intrinsic or extrinsic functions, whereby a result 680 can be obtained. The query result 680 can be returned to a client from which the natural language query 610 originated.

Also shown in FIG. 6 are a ruleset 622 and a fallback code 624. Ruleset 622 can incorporate a plurality of rules (similar to 324) incorporating the logic for bridging outputs 620, 622 of NLP engine 615 to an output query 670 conforming with an exposed interface of database engine 675. As such, the ruleset can be additional input used by blocks 625, 635, or 655. In some examples, the mapping between sub-intents and query destinations can be partly or wholly included within ruleset 622. In such examples, ruleset 622 can also be an input to block 645.

Fallback code 624 can be used as a condition code or error code or status monitoring flag, and can be an atomic datatype (e.g. a single variable) or a complex datatype (e.g. a set, array, or list of code or flag variables). Initially, a fallback code can be included within the query structure 614 as received from NLP engine 615 (as indicated by unidirectional arrow into code 624). Subsequently, the fallback code 624 can be read, modified, or written by process blocks within the bridge module, such as blocks 625, 635, 645, or 655 (as indicated by bidirectional arrows into and out from code 624).

Second Example Method

Figure 7:
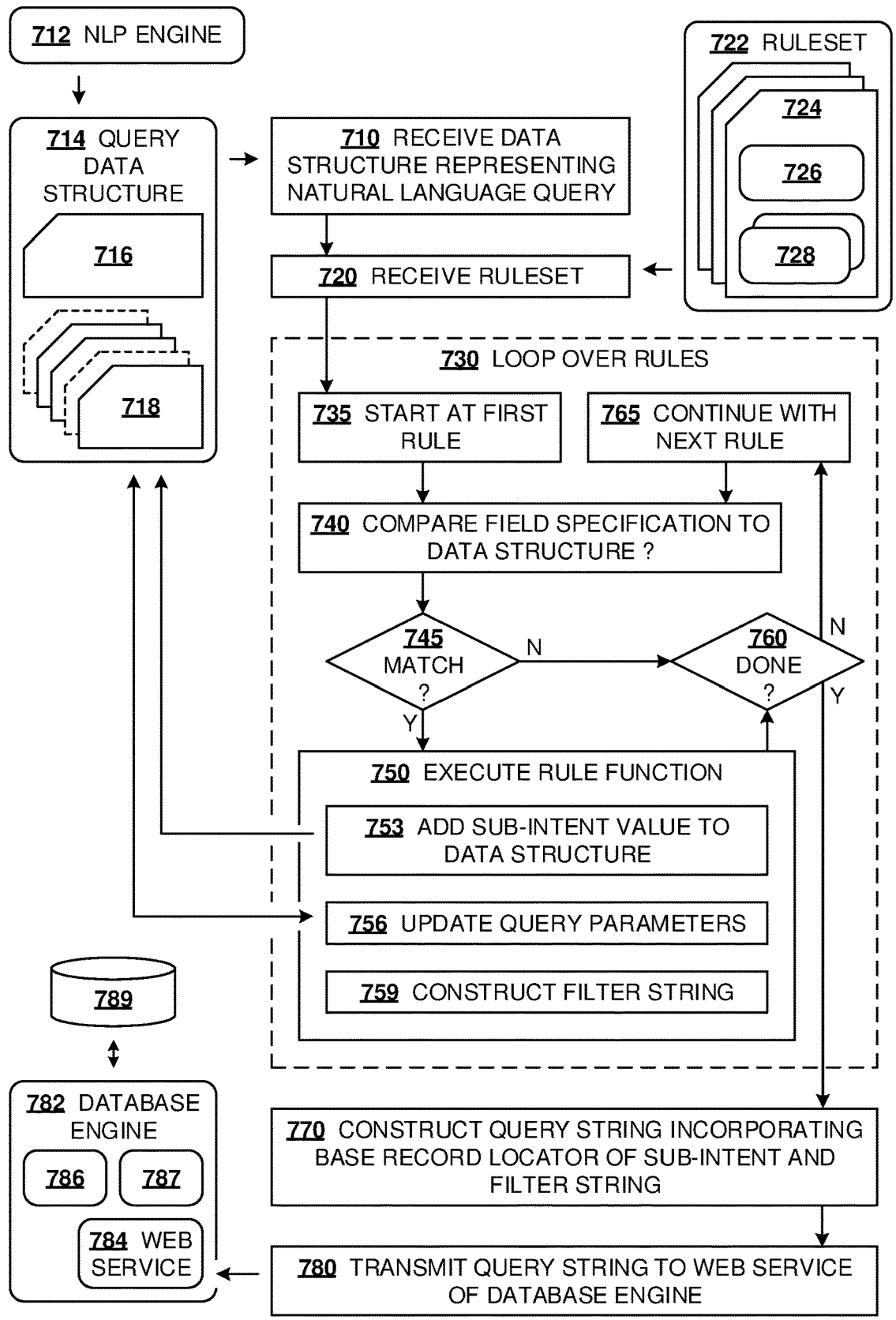
FIG. 7 is a flowchart of a second example method for implementing disclosed technologies.

FIG. 7 is a flowchart 700 of another example method for implementing disclosed technologies. In this method, a query data structure representing a natural language query is received and evaluated, leading to transmission of an output query string to a web service of a database engine.

At block 710, a query data structure 714 representing a natural language query can be received from a natural language processing (NLP) engine 712. The query data structure 714 can include an intent 716 and one or more query parameters in the form of fields 718 with values. In FIG. 7, some of the fields 718 are shown with solid outline, to indicate that they are defined or have defined values, while other fields 718 are shown in dashed outline to indicate that they are undefined.

At block 720, a ruleset 722 can be received, incorporating a plurality of rules 724, each with a field specification 726 and at least one function 728. Dashed outline 730 represents a loop over the plurality of rules 724. At block 735, the loop commences with a first rule 724, and at block 740, the field specification 726 of the instant rule 724 can be compared with the query structure 714. At decision block 745, a determination is made whether the comparison is a match. A match can be found in three cases, for first, second, and third rules 724, which can be a same rule 724, three distinct rules 724, or two distinct rules 724. Respective functions 728 can be executed for the matching rules. The first rule's function 728 can determine a sub-intent and can add the sub-intent to the query structure 714 at block 753. The second rule's function 728 can update one or more of the query parameters 718 at block 756. At block 759, the third rule's function 728 can construct a filter string from one or more of the updated (from block 756) or received (from block 710) query parameters 718.

The method proceeds to decision block 760 after executing the function(s) 728 for a matching rule, or directly via the N branch from block 745 in case of a non-matching rule. At block 760, a termination condition can be evaluated to determine whether loop 730 is done. Exemplary termination conditions can include: exhaustion of the ruleset 722; completion of necessary processing for the determined sub-intent; or an exception condition. If the termination condition is not met, the method follows the N branch from block 760 to block 765, where the next rule is brought in focus, and the method can continue to block 740. However, if the termination condition is met, then the method can follow the Y branch from block 760 and exit the loop to block 770, where a query string can be constructed. The query string can incorporate a base record locator corresponding to the sub-intent, together with one or more filter strings, e.g. from block 759.

Finally, at block 780, the query string can be transmitted to web service 784 of a database engine 782, for generation of a result. As shown, database engine 782 can be coupled to data store 789, and can include intrinsic functions 786 as well as extrinsic functions 787, for fulfilling received queries.

In some examples, checking for a match at block 745 can be performed using a hash map storing indices of field positions of respective fields of a query data structure. A field of the field specification can be hashed to retrieve its hash value from the hash map. The hash value can be used as an index into the query data structure to determine whether the instant field is defined at the indexed location within the query data structure. A determination can also be made regarding whether a condition specified for the instant field in the field specification (e.g. a value, range of values, or Undefined) is satisfied. Successive fields of the field specification can be processed in this manner, and the processing at block 745 can terminate when all fields of the field specification have been evaluated, or when one field has been found which does not satisfy the condition specified in the field specification.

Example System Architecture

Figure 8:
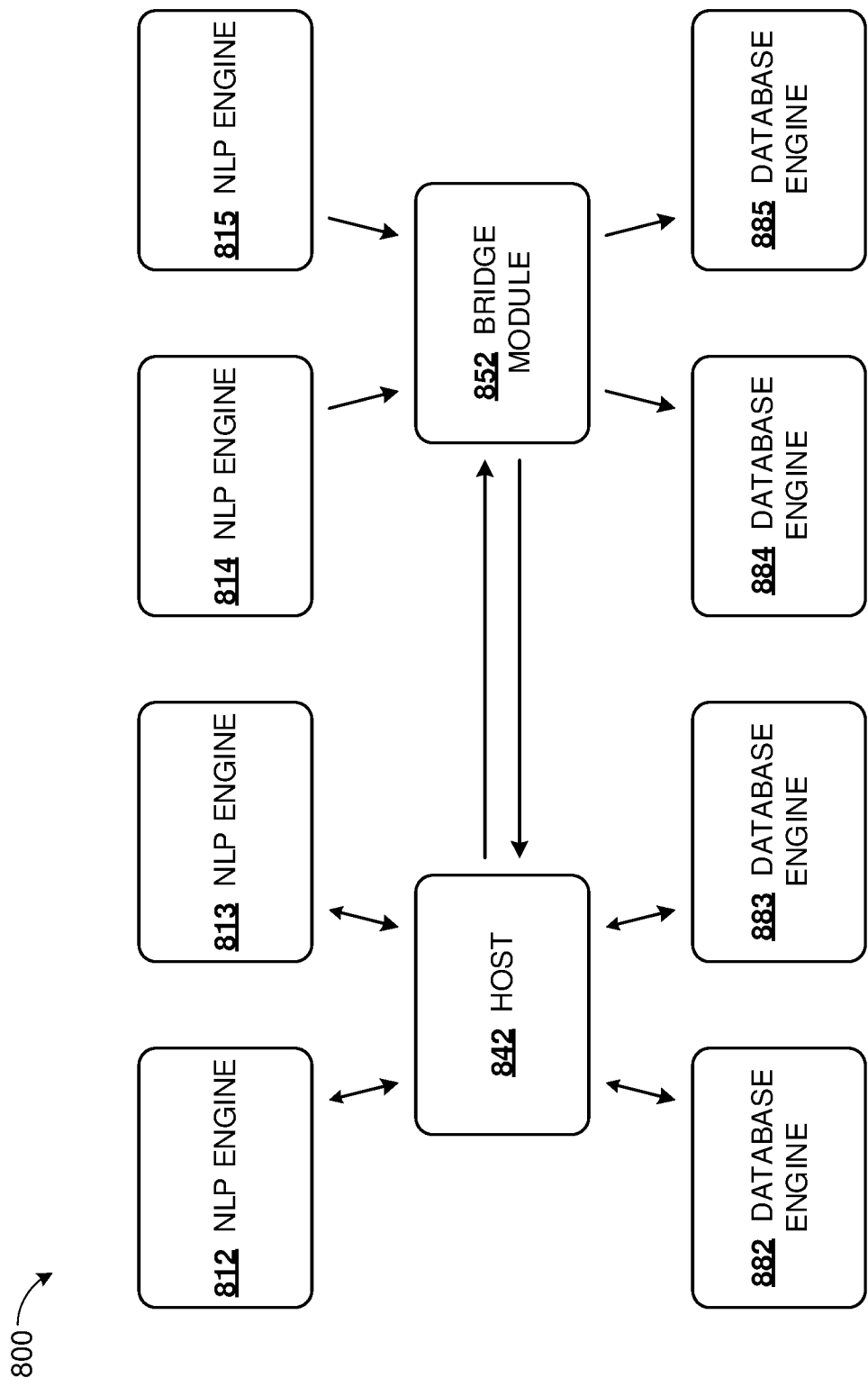
FIG. 8 is a diagram illustrating system configurations in which disclosed technologies can be deployed.

FIG. 8 is a diagram 800 illustrating system configurations in which disclosed technologies can be deployed. Particularly, diagram 800 depicts hub-and-spoke and multi-headed configurations.

NLP engines 812-815 can process natural language queries from clients (not shown) and can output query structures to be processed by bridge module 852. Bridge module 852 can generate corresponding query strings which can be transmitted to one or more of database engines 882-885 for fulfillment. A single bridge module 852 can be coupled to receive query data structures from multiple NLP engines directly (e.g. from engines 814-815) or indirectly (e.g. from engines 812-813). A single bridge module 852 can be coupled to transmit queries to multiple database engines directly (e.g. to engines 884-885) or indirectly (e.g. to engines 882-883).

Host computer 842 can mediate data transfer between the NLP engines 812-813, bridge module 852, and database engines 882-883. For example, a client natural language query can be routed by host 842 to NLP engine 813 for processing. The resulting query structure can be returned to host 842 and forwarded to bridge 852. A query string from bridge 852 can be returned to host 842, and routed to database engine 882 for fulfillment. Any combination of NLP engines 812-815 or database engines 882-885 can be supported. To illustrate, a query structure received from NLP engine 815 can be processed by bridge module 852 as described herein. According to the identified sub-intent, some queries can be routed directly to database engine 884, while other queries can be forwarded to host 842 and relayed to database engine 882 for fulfillment.

Example Natural Language Processing Engine

Figure 9:
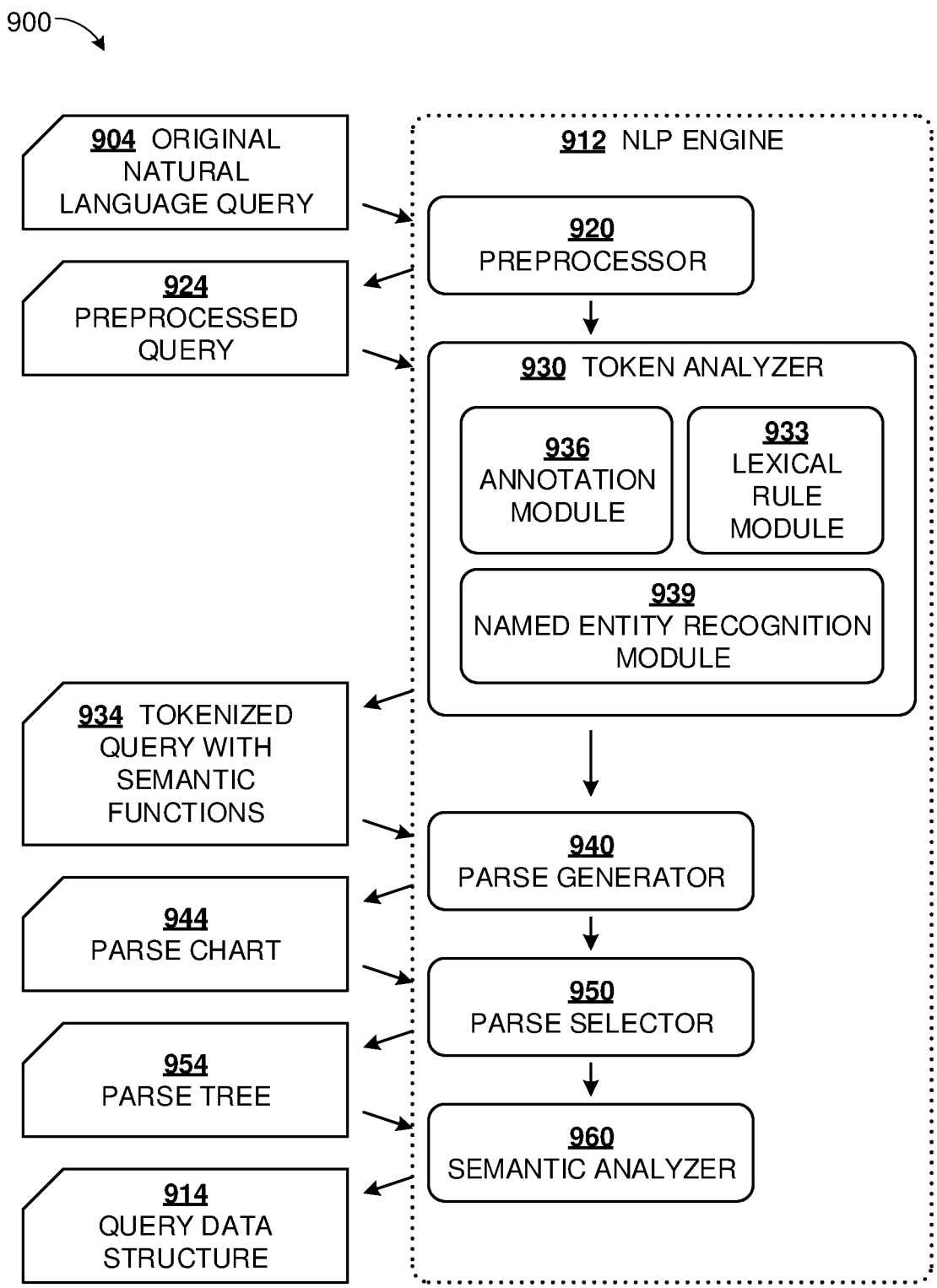
FIG. 9 is a hybrid diagram illustrating operation of an example NLP engine suitable for the disclosed technologies.

FIG. 9 is a hybrid diagram 900 illustrating operation of an example NLP engine. The right side of FIG. 9 depicts software components of an NLP engine 912, while the left side depicts data objects consumed or generated by the various software components.

Initially, preprocessor 920 can consume an original natural language query 904 to generate a preprocessed query 924. Preprocessor 920 can be configured to perform operations such as removing unwanted characters, applying spell-check, or case conversion. Then, the preprocessed query 924 can be consumed by token analyzer 930 to generate a tokenized query 934. Token analyzer can categorize words of tokens of the preprocessed query 924 using a variety of techniques, sequentially or in parallel, in any combination. The illustrated token analyzer 930 includes an annotation module 933, a lexical rule module 936, and a named entity recognition (NER) module 939. These modules can operate word-by-word (or, token-by-token), on a span of the query (e.g. a contiguous sequence of tokens within the query), or on an entire query.

Lexical rule module 933 can apply lexical rules, to replace matching tokens or token sequences with predefined tokens having associated functions defining their semantics. For example, successive unary rules can identify a word "yesterday" as a corresponding token $Yesterday, and further map $Yesterday to $RelativeDate. A binary rule can map a token sequence $To $Date to a single token $EndDate, where $To was obtained from words like "to", "till", or "ending" and $Date was obtained from a string "Jul. 1, 2020". Lexical rules can also advantageously be applied to determine a query's intent.

Because higher level tokens can be more general than lower level tokens, the higher level tokens can inherit semantic functions from their lower level tokens. To illustrate, an $EndDate token can inherit an original (leaf-level) semantic function indicating its value as "Jul. 1, 2020". The inheritance can be by value or by reference. Inheritance by reference can be preferred because it supports dynamic evaluation of semantics after a complete parse tree of the query has been generated. Because of ambiguities present in natural language, the semantic value of a given token can be different according to the specific parse tree. Top-down semantic evaluation can correctly evaluate semantic values in context of the parse tree.

Annotation module 936 can operate similarly to lexical rule module 933. Where lexical rule module 933 operates on general purpose terminology (e.g. dates, prepositions or other relational operators), annotation module 936 can use a database or library of domain-specific terminology to identify tokens and assign corresponding semantic functions. In the context of transportation management, domain-specific terminology can include terms like "vehicle" and its synonyms, "maintenance", "tonnage", and suchlike. Annotation can also be performed using regular expressions.

NER module 939 can use a trained neural network (such as one based on a BERT language model) to identify named tokens within a domain. NER module 939 can identify tokens based on an overall query, even where specific keywords may be absent from the query. NER technology can be particularly advantageous for identifying entities such as names or dates.

Thus, token analyzer can output a tokenized query 934 that includes semantic functions associated with one or more of the tokens. Some tokens can be aggregated by the token analyzer 930 (e.g. "William" and "Johnson" can be aggregated into a token Name="William Johnson") however, in general, the tokenized query 934 may not contain a single joined token representing the entire query.

Then, parse generator 940 can consume the tokenized query 934 to generate a parse chart 944. Parse generator can combine the tokens of tokenized query 934 in various ways. Each way of combining can generate a respective parse tree for the query. The token combination can be done using dynamic programming on spans of the tokenized query 934. To illustrate, parse trees for span (4,7) (that is, a span from the $4^{th}$ to the $7^{th}$ token of tokenized query 934) can be efficiently built using previously computed parse trees for span (4,6) (combined with token 7) or span (5,7) (combined with token 4). The parse trees can be stored in parse chart 944. To illustrate, a cell at row 3, column 9 of parse chart 944 can include all parse trees for span (3,9) of the tokenized query 934. If there are a total of 10 tokens in tokenized query 934, then cell (1,10) can contain all parse trees for the entire query.

The parse chart 944 can be consumed by parse selector 950 to select one parse tree 954 among the candidate parse trees for the entire query (e.g. at cell (1,10)). Parse selector 950 can evaluate a feature function for each candidate parse tree to determine respective scores, and the highest scoring parse tree can be selected as output 954. To illustrate, a feature can be a number of times a given rule (e.g. lexical rule $To+$Date→$EndDate) was used in an instant parse tree, and a feature vector can be formed from the multiple rules available in token analyzer 930. A dot product of the feature vector with a weights vector can yield the score. The weights vector can be derived from machine learning on a training dataset of labeled queries. The training labels can be the correct query data structures for each training query.

Finally, semantic analyzer 960 can consume the selected parse tree 954 by performing top-down evaluation of semantic functions to load an intent and recognized query parameters into an query data structure similar to 414. For example, when a token $Date is found with inherited semantic function evaluating to "Last Month", the value "Last Month" can be assigned to the Date field in query structure 414.

The described NLP engine is illustrative, and other NLP approaches can also be used.

A Generalized Computer Environment

Figure 10:
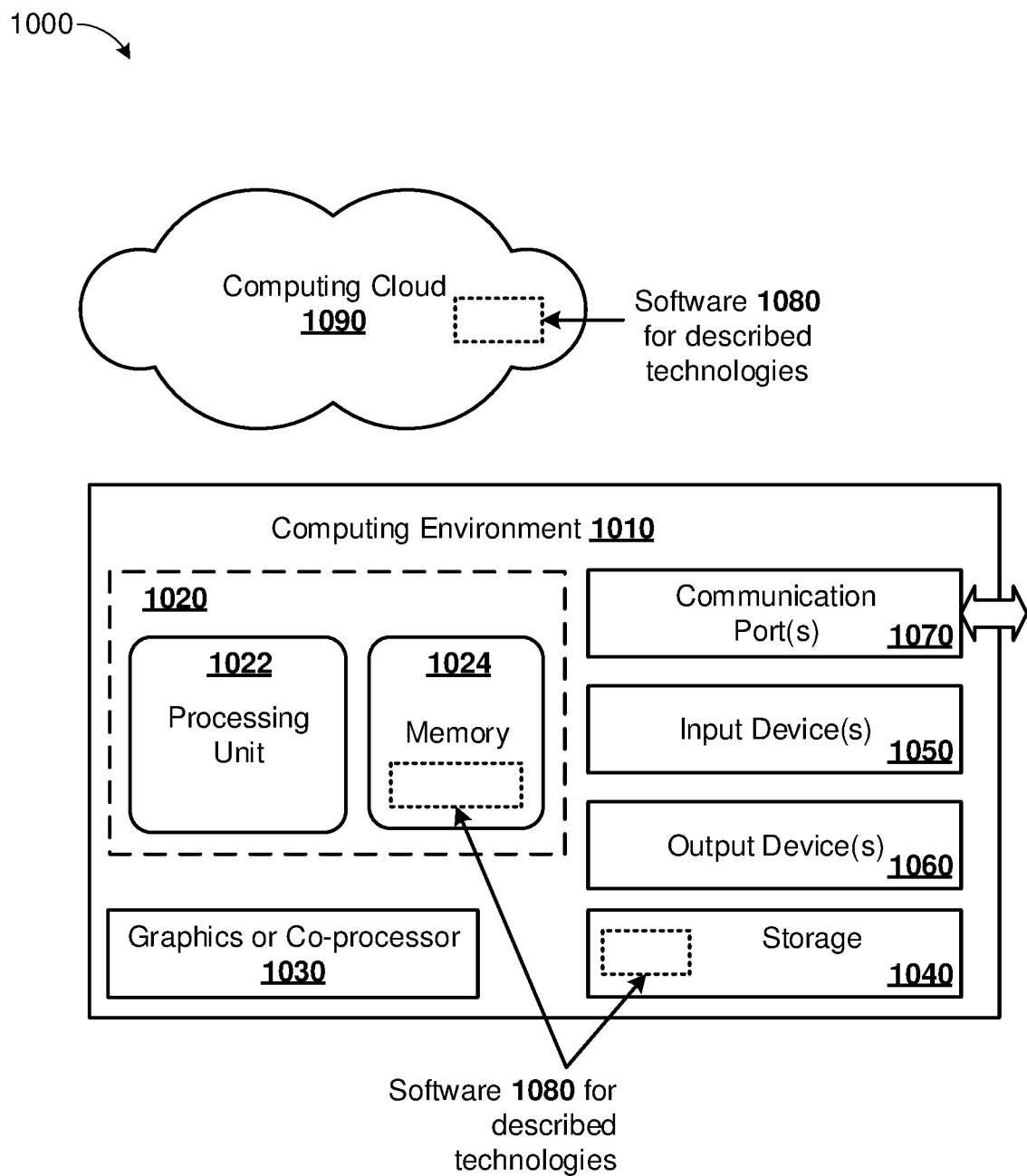
FIG. 10 is a diagram schematically depicting a computing environment suitable for implementation of disclosed technologies.

FIG. 10 illustrates a generalized example of a suitable computing system 1000 in which described examples, techniques, and technologies, including construction, deployment, operation, and maintenance of a bridge module, associated NLP or database engines, or components thereof, can be implemented according to disclosed technologies. The computing system 1000 is not intended to suggest any limitation as to scope of use or functionality of the present disclosure, as the innovations can be implemented in diverse general-purpose or special-purpose computing systems.

With reference to FIG. 10, computing environment 1010 includes one or more processing units 1022 and memory 1024. In FIG. 10, this basic configuration 1020 is included within a dashed line. Processing unit 1022 executes computer-executable instructions, such as for implementing any of the methods or objects described herein for analyzing NLP output data structures, processing rules, executing associated functions, building database compatible queries, or various other architectures, components, handlers, managers, modules, or services described herein. Processing unit 1022 can be a general-purpose central processing unit (CPU), a processor in an application-specific integrated circuit (ASIC), or any other type of processor. In a multi-processing system, multiple processing units execute computer-executable instructions to increase processing power. Computing environment 1010 can also include a graphics processing unit or co-processing unit 1030. Tangible memory 1024 can be volatile memory (e.g., registers, cache, or RAM), non-volatile memory (e.g., ROM, EEPROM, or flash memory), or some combination thereof, accessible by processing units 1022, 1030. Memory 1024 stores software 1080 implementing one or more innovations described herein, in the form of computer-executable instructions suitable for execution by processing unit(s) 1022, 1030. Memory 1024 can also store a ruleset, output from an NLP engine, filter strings, output query strings, configuration data, user interface buffers or displays, browser code, other data structures including data tables, working tables, change logs, output structures, input fields, output fields, data values, indices, or flags, as well as other operational data.

A computing system 1010 can have additional features, such as one or more of storage 1040, input devices 1050, output devices 1060, or communication ports 1070. An interconnection mechanism (not shown) such as a bus, controller, or network interconnects the components of the computing environment 1010. Typically, operating system software (not shown) provides an operating environment for other software executing in the computing environment 1010, and coordinates activities of the components of the computing environment 1010.

Tangible storage 1040 can be removable or non-removable, and includes magnetic disks, magnetic tapes or cassettes, CD-ROMs, DVDs, or any other medium which can be used to store information in a non-transitory way and which can be accessed within the computing environment 1010. Storage 1040 stores instructions of the software 1080 (including instructions and/or data) implementing one or more innovations described herein.

Input device(s) 1050 can be a mechanical, touch-sensing, or proximity-sensing input device such as a keyboard, mouse, pen, touchscreen, trackball, a voice input device, a scanning device, or another device that provides input to computing environment 1010. The output device(s) 1060 can be a display, printer, speaker, optical disk writer, or another device that provides output from the computing environment 1010.

Communication port(s) 1070 can enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1000 can also include a computing cloud 1090 in which instructions implementing all or a portion of the disclosed technology are executed. Any combination of memory 1024, storage 1040, and computing cloud 1090 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system", "environment", and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 11:
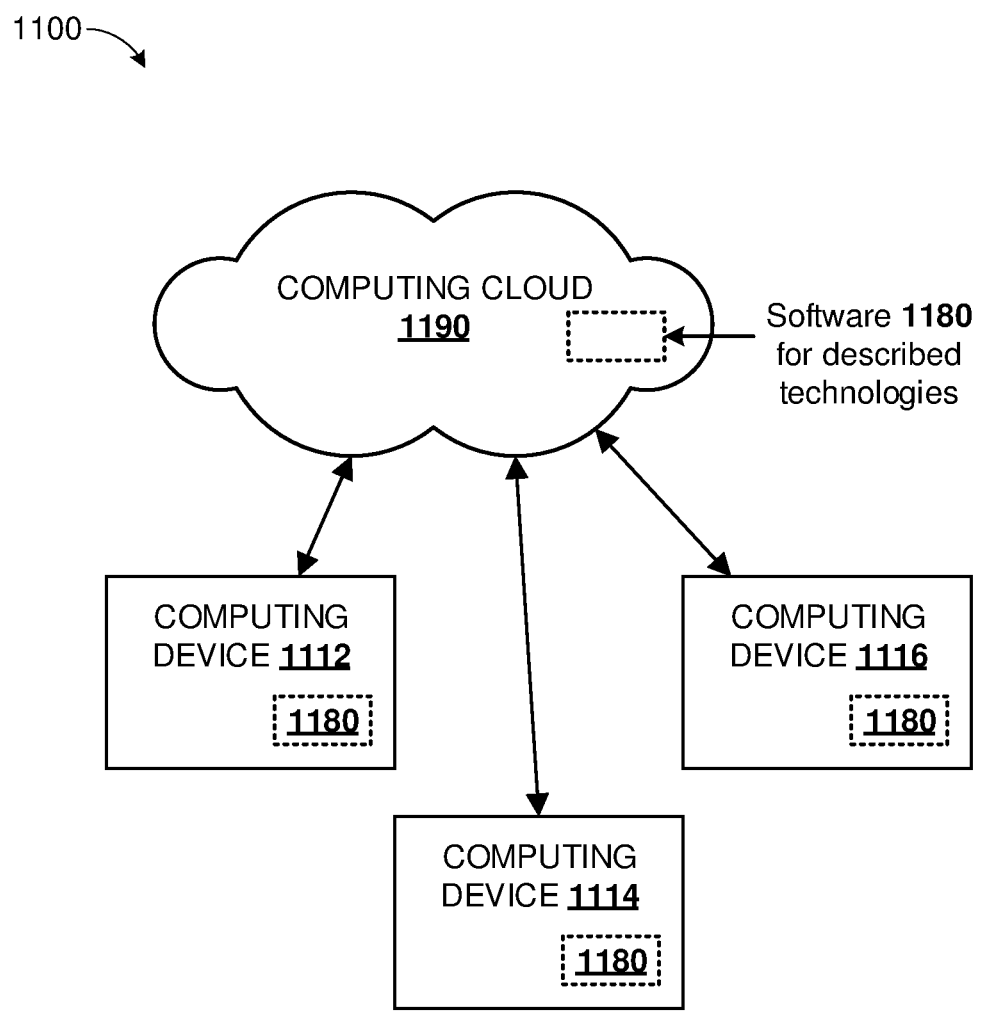
FIG. 11 is a diagram schematically depicting computing devices operating in conjunction with a computing cloud for implementation of disclosed technologies.

FIG. 11 depicts an example cloud computing environment 1100 in which the described technologies can be implemented. Cloud computing environment 1100 comprises a computing cloud 1190 containing resources and providing services. Computing cloud 1190 can comprise various types of cloud computing resources, such as computer servers, data storage repositories, networking resources, and so forth. Computing cloud 1190 can be centrally located (e.g., provided by a data center of a business or organization) or distributed (e.g., provided by various computing resources located at different locations, such as different data centers and/or located in different cities or countries).

Computing cloud 1190 can be operatively connected to various types of computing devices (e.g., client computing devices), such as computing devices 1112, 1114, and 1116, and can provide a range of computing services thereto. One or more of computing devices 1112, 1114, and 1116 can be computers (e.g., servers, virtual machines, embedded systems, desktop, or laptop computers), mobile devices (e.g., tablet computers, smartphones, or wearable appliances), or other types of computing devices. Communication links between computing cloud 1190 and computing devices 1112, 1114, and 1116 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1112, 1114, and 1116 can also be connected to each other.

Computing devices 1112, 1114, and 1116 can utilize computing cloud 1190 to obtain computing services and perform computing operations (e.g., data processing, data storage, and the like). Particularly, software 1180 for performing the described innovative technologies can be resident or executed in computing cloud 1190, in computing devices 1112, 1114, and 1116, or in a distributed combination of cloud and computing devices.

General Considerations

As used in this disclosure, the singular forms "a", "an", and "the" include the plural forms unless the surrounding language clearly dictates otherwise. Additionally, the terms "includes" and "incorporates" mean "comprises". Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "add", "aggregate", "analyze", "apply", "assign", "calculate", "call", "combine", "compare", "compute", "concatenate", "configure", "construct", "count", "detect", "delete", "determine", "display", "evaluate", "extract", "form", "fulfill", "generate", "hash", "identify", "initialize", "insert", "invoke", "loop", "map", "obtain", "output", "perform", "predict", "preprocess", "process", "receive", "remove", "request", "return", "retrieve", "select", "send", "set", "store", "sum", "train", "transform", "transmit", "update", or "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1024 and storage 1040. The terms computer-readable media or computer-readable storage media do not include signals or carrier waves. In addition, the terms computer-readable media or computer-readable storage media do not include communication ports (e.g., 1070) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technology can be implemented by software written in ABAP, Adobe Flash, Angular, C, C++, C #, Curl, Dart, Fortran, Go, JAVA®, JAVASCRIPT®, Julia, Lisp, Matlab, Octave, Perl, PYTHON®, R, Ruby, SAS, SPSS, WebAssembly languages, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing instructions which, when executed by one or more hardware processors, causes the one or more hardware processor(s) to perform operations comprising:
   at a bridge module, wherein a natural language processing (NLP) engine, the bridge module, and a database engine are distinct from each other:
   receiving, from the NLP engine, a data structure comprising, for respective fields of the data structure, (i) an intent indicating a purpose or goal of a natural language query and (ii) one or more input query parameters extracted from the natural language query;
   analyzing the data structure to determine a sub-intent;
   transforming a set of the input query parameters into a set of output query parameters based at least partly on the sub-intent;
   determining a query destination based on the sub-intent, wherein the query destination is one of a plurality of destinations available at the database engine;
   constructing an output query comprising the query destination and a filter derived from the set of output query parameters, wherein the filter specifies one or more parameters of the output query; and
   transmitting the output query to the query destination.

2. The computer-readable media of claim 1, wherein the analyzing operation comprises:
   processing a set of rules according to a predefined ordering, each rule comprising a respective pattern among the fields of the data structure, wherein the processing comprises:
   for successive rules of the set of rules, comparing the respective patterns with the fields defined in the data structure;
   determining that the comparing is a match, for a first rule of the successive rules; and
   selecting the sub-intent as predefined for the first rule.

3. The computer-readable media of claim 2, wherein the processing comprises determining that the comparing is a match, for a second rule of the successive rules, and the transforming comprises executing a transformation function, predefined for the second rule, on at least one of the input query parameters.

4. The computer-readable media of claim 3, wherein the executing causes one or more new fields to be added to the data structure.

5. The computer-readable media of claim 2, wherein the processing comprises determining that the comparing is a match, for a third rule of the successive rules, and the constructing comprises executing a filter generation function to generate a filter, predefined for the third rule, on at least one of the output query parameters.

6. The computer-readable media of claim 2, wherein the operations further comprise:
   adding the selected sub-intent to the data structure.

7. The computer-readable media of claim 1, wherein the query destination is a web service represented by a uniform record locator (URL).

8. The computer-readable media of claim 1, wherein the sub-intent is determined from among at least first and second available sub-intents, and the query destination based on the first available sub-intent is an intrinsic query of a database environment, and the query destination based on the second available sub-intent is an extrinsic query of the database environment.

9. The computer-readable media of claim 1, wherein the sub-intent is determined from among at least first and second available sub-intents, and the respective query destinations for the first and second available sub-intents are distinct database environments.

10. The computer-readable media of claim 1, wherein the transforming operation comprises deleting one or more of the input query parameters that are not required by the identified sub-intent.

11. The computer-readable media of claim 1, wherein the transforming operation comprises parsing a given one of the input query parameters into multiple parameters of the output query parameters.

12. The computer-readable media of claim 1, wherein the received data structure comprises a fallback code indicating that no exception was encountered during processing of the natural language query, and the operations further comprise:
   setting the fallback code to indicate an exception encountered during the analyzing, transforming, or determining operations.

13. The computer-readable media of claim 1, wherein the data structure is in JavaScript Object Notation (JSON) or Extensible Markup Language (XML) format.

14. The computer-readable media of claim 1, wherein the transmitted output query conforms to Open Data Protocol (OData).

15. A computer-implemented method comprising:
   receiving a data structure representing a natural language query from a natural language processing (NLP) engine, the data structure comprising, for respective fields of the data structure, an intent and one or more query parameters, wherein the intent is a primary classification of the natural language query;
   receiving a ruleset comprising a plurality of rules, each rule respectively comprising a field specification and identifying a function;
   for each of the plurality of rules, determining whether the data structure matches the respective field specification, wherein the data structure is determined to match the respective field specification for at least first, second, and third rules of the plurality of rules;
   for the first rule, executing the respective function to add a sub-intent value to the data structure, wherein the sub-intent value is a secondary classification of the natural language query, within the intent;
   for the second rule, executing the respective function to update the query parameters in the data structure;

for the third rule, executing the respective function to construct a filter string, using a format specified by the third rule to encode one or more of the received or updated query parameters;

determining a query destination based upon the sub-intent value;

constructing a query string comprising the query destination and the filter string; and transmitting the query string to a web service of a database engine for generation of a result.

16. The method of claim 15, wherein the field specification for the first rule comprises identifiers of one or more of the fields defined in the data structure at the time of the determining for the first rule.

17. The method of claim 15, wherein the field specification for the second rule comprises the sub-intent value.

18. The method of claim 15, wherein the determining comprises:

for a first field of the field specification:
  (a) obtaining a hash value for the first field from a hash map; and
  (b) using the hash value as an index into the data structure to check whether the first field is defined in the data structure at a position specified by the index; and repeating actions (a) and (b) for a second field of the field specification.

19. A system comprising:

one or more hardware processors with memory coupled thereto; and computer-readable storage media storing instructions which, when executed by the one or more hardware processors, cause the one or more hardware processors to implement a natural language processing (NLP) engine and a bridge module;

wherein the NLP engine is configured to receive a natural language query and process the natural language query by:

preprocessing the natural language query to obtain a preprocessed query;

applying an annotator, named entity recognition, and lexical rules in parallel to obtain a plurality of parse trees representing the natural language query;

obtaining respective scores for the parse trees;

selecting one of the parse trees based on the scores; and identifying an intent and input query parameters according to the selected parse tree; and storing the intent and the input query parameters in an intermediate data structure;

wherein the bridge module is configured to generate a query string, corresponding to the natural language query, by:

comparing a plurality of rules to attributes of the intermediate data structure to determine one or more matching rules of the plurality of rules;

based on the one or more matching rules:
  identifying a sub-intent and a corresponding base record locator; and
  transforming a set of the input query parameters into a set of output query parameters; and
  constructing a query filter from the output query parameters; and constructing the query string from the base record locator and the query filter; and wherein the system is configured to obtain a result for the natural language query by:

transmitting the query string to the database engine.

20. The system of claim 19, wherein the parse trees are obtained by bottom-up evaluation of a sequence of tokens extracted from the natural language query; and wherein the input query parameters are obtained by top-down evaluation of one or more semantic functions on respective nodes of the selected parse tree.

* * * * *